(12) United States Patent
Song et al.

(10) Patent No.: US 11,815,721 B2
(45) Date of Patent: Nov. 14, 2023

(54) PHOTONIC INTEGRATED CIRCUIT HAVING REDUNDANT LIGHT PATH AND METHOD OF USING

(71) Applicant: TAIWAN SEMICONDUCTOR MANUFACTURING COMPANY, LTD., Hsinchu (TW)

(72) Inventors: Weiwei Song, Hsinchu (TW); Stefan Rusu, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

(21) Appl. No.: 17/443,704

(22) Filed: Jul. 27, 2021

(65) Prior Publication Data

US 2022/0365284 A1 Nov. 17, 2022

Related U.S. Application Data

(60) Provisional application No. 63/187,554, filed on May 12, 2021.

(51) Int. Cl.
 *G02B 6/293* (2006.01)
 *G02B 6/42* (2006.01)
(52) U.S. Cl.
 CPC ....... *G02B 6/29395* (2013.01); *G02B 6/2935* (2013.01); *G02B 6/2938* (2013.01); *G02B 6/29338* (2013.01); *G02B 6/4215* (2013.01)

(58) Field of Classification Search
 CPC ............ G02B 6/29395; G02B 6/29338; G02B 6/2935; G02B 6/2938; G02B 6/4215
 See application file for complete search history.

(56) References Cited

U.S. PATENT DOCUMENTS 10,690,856 B2 6/2020 Bahl et al.
11,079,376 B1 * 8/2021 Najar ..................... G01N 21/25

FOREIGN PATENT DOCUMENTS

| CN | 111758055 | 10/2020 |
|----|-----------|---------|
| TW | 546496 | 8/2003 |
| TW | 202016592 | 5/2020 |

\* cited by examiner

*Primary Examiner* — John Bedtelyon
(74) *Attorney, Agent, or Firm* — Hauptman Ham, LLP

(57) ABSTRACT

An integrated circuit includes an electronic circuit. The integrated circuit further includes a photonic device. The photonic device includes a first photodetector (PD) electrically connected to the electronic circuit. The photonic device further includes a second PD electrically connected to the electronic circuit. The photonic device further includes a first waveguide configured to receive an optical signal input, wherein the first waveguide is optically connected to the first PD. The photonic device further includes a second waveguide optically connected to the second PD. The photonic device further includes a resonant structure between the first waveguide and the second waveguide, wherein the resonant structure is configured to optically couple the first waveguide to the second waveguide.

20 Claims, 14 Drawing Sheets

PHOTONIC INTEGRATED CIRCUIT HAVING REDUNDANT LIGHT PATH AND METHOD OF USING

PRIORITY CLAIM AND CROSS-REFERENCE

This application claims priority to U.S. provisional application No. 63/187,554, filed May 12, 2021, the entire contents of which are hereby incorporated by reference.

BACKGROUND

Photonic devices are used in integrated circuits (ICs) in order to carry signals from one component to another component faster than is possible using electrical signals. Electrical signals are converted into optical signals at one end of a waveguide; the optical signals propagate along the waveguide, and the optical signals are converted back into electrical signals at the other end of the waveguide.

While photonic devices are formed using inexpensive materials, photonic devices are sensitive to process variation which impacts performance of the photonic devices. Photonic devices are also sensitive to degradation overtime, for example, due to oxidation or moisture penetration. The large size of photonic devices is a constraint for further device size reduction.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
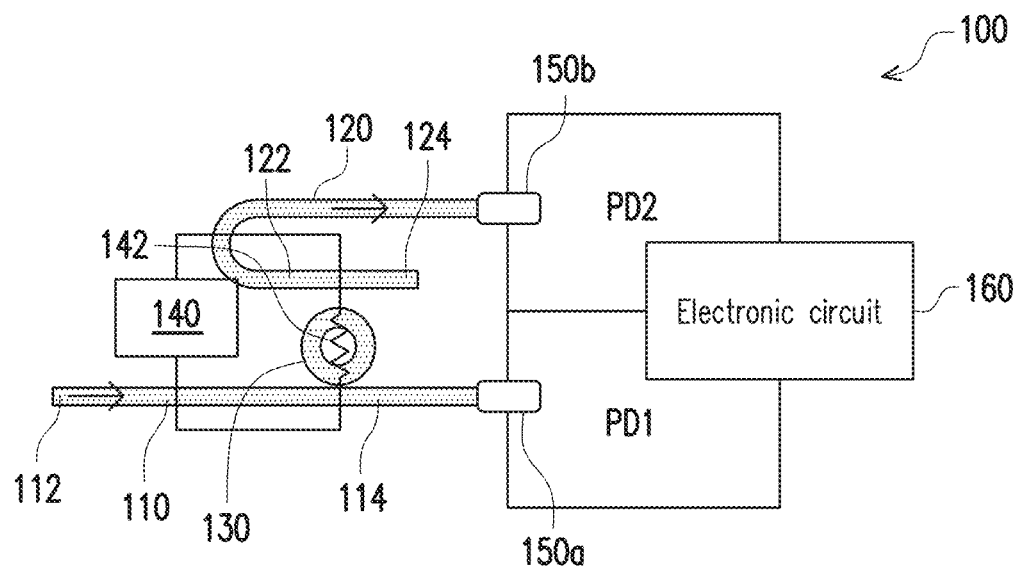
FIG. 1 is a schematic view of a photonic device in an integrated circuit (IC) in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

While photonic devices in integrated circuits (ICs) help to convey signals between components faster than electrical signals, the size of photonic devices often inhibits the formation of redundant systems that are usable in the case of failure of a portion of the photonic device or an IC component connected to the photonic device. Photonic devices are sensitive to subsequent processing because optical properties of silicon are impacted by thermal variations. In situations where subsequent processing causes the silicon to perform in an unsatisfactory manner, the final device is not usable thereby reducing production yield. In addition, oxidation and moisture penetration over time reduce the useful life of some photonic devices. With no redundancy built into the photonic device, the entire device fails if the photonic device degrades to the point of failure.

This description includes photonic devices having redundant components that help to improve production yield and useful life of ICs which include photonic devices. In some embodiments, the redundant component is actively controlled, for example using thermal or electrical control. In some embodiments, the redundant component is passive, so active control is avoided.

The redundant component helps to minimize the increase in the size of the device in comparison with providing an entire redundant photonic device. For example, a resonant structure, such as a resonant ring, has a size of approximately 100 square microns ($\mu m^2$). By comparison, an electrical contact pad in some technology nodes has a size of approximately 2,500 $\mu m^2$. As a result, the photonic device is less of an inhibitor to further device size reduction while at the same time improving production yield and useful life of the device.

In addition to improvements in production yield and useful life, the use of passive redundant components also helps to improve efficiency of the IC. For example, directing an optical signal to two photodetectors (PDs) is able to help improve efficiency of conversion of the optical signal to an electrical signal. In addition, the redundant components permit an increase in a power range of a receiver by distributing an optical signal over multiple PDs.

FIG. 1 is a schematic view of a photonic device 100 in an IC in accordance with some embodiments. The photonic device 100 includes a primary waveguide 110 having an input port 112 and a through port 114. The photonic device 100 further includes a redundant waveguide 120 having a drop port 122 and an add port 124. A resonant structure 130, sometimes called a resonant ring, is usable to optically couple the primary waveguide 110 to the redundant waveguide 120. A controller 140 is connected to a control element 142 for controlling coupling using the resonant structure 130. The through port 114 of the primary waveguide 110 is optically connected to a first photodetector (PD) 150a. The drop port 122 of the redundant waveguide 120 is optically connected to a second PD 150b. Both the first PD 150a and the second PD 150b are configured to convert an incident optical signal to an electrical signal. Both the first PD 150a and the second PD 150b are electrically connected to an electronic circuit 160 of the IC.

The primary waveguide 110 includes a core including an optically transparent material and is configured to permit propagation of an optical signal from the input port 112 to the through port 114. In some embodiments, the core of the primary waveguide 110 includes silicon. In some embodiments, the core of the primary waveguide 110 includes polymer, glass, silicon nitride or another suitable material. A cladding material surrounds the core. The cladding material has a different refractive index from the core in order to help reduce an amount of signal loss as the optical signal propagates along the primary waveguide 110. In some embodiments, the cladding material is silicon oxide, polymer or another suitable material. In some embodiments, the cladding material is a same material as that used in an inter-layer dielectric (ILD) layer or inter-metal dielectric (IMD) layer for the IC. In some embodiments, the cladding material is continuous without the ILD layer or IMD layer of the IC. In some embodiments, the primary waveguide 110 has a circular cross-section. In some embodiments, the primary waveguide 110 has a rectangular cross-section.

The input port 112 is configured to receive an incident optical signal and couple the incident optical signal into the core of the primary waveguide 110. In some embodiments, the incident optical signal is received from another component of the IC. In some embodiments, the incident optical signal is received from an external device. In some embodiments, a grating coupler is included at the input port 112 to couple the incident optical signal into the primary waveguide 110. In some embodiments, an edge coupler with a lens or a curvature is included at the input port 112 to increase an acceptance angle or assist with coupling of the incident optical signal into the core of the primary waveguide 110. In some embodiments, a coating, such as an anti-reflective (AR) coating, is on a surface of the input port 112 to assist with coupling of the incident optical signal into the core of the primary waveguide 110.

The through port 114 is configured to emit the optical signal from the core of the primary waveguide 110 to the first PD 150a. In some embodiments, a grating coupler is included at the through port 114 to output the optical signal to the first PD 150a. In some embodiments, an edge coupler with a lens or a curvature is included at the through port 114 in order to improve coupling between the core of the primary waveguide 110 and the first PD 150a and to reduce cross-talk between adjacent PDs by minimizing an amount of the optical signal that is incident on the adjacent PDs. In some embodiments, a coating, such as an AR coating, is on the through port 114 in order to maximize an intensity of the optical signal coupled to the first PD 150a.

The redundant waveguide 120 has a similar structure as the primary waveguide 110. In some embodiments, a core of the redundant waveguide 120 includes a same material as the core of the primary waveguide 110. In some embodiments, the core of the redundant waveguide 120 includes a different material from the core of the primary waveguide 110. In some embodiments, a cladding of the redundant waveguide 120 has a same material as the cladding of the primary waveguide 110. In some embodiments, the cladding of the redundant waveguide 120 has a different material from the cladding of the primary waveguide 110. In some embodiments, the cladding of the redundant waveguide 120 is continuous with the cladding of the primary waveguide 110. In some embodiments, the redundant waveguide 120 is a same distance from a substrate as the primary waveguide 110. In some embodiments, a distance from the substrate to the redundant waveguide 120 is different from a distance from the substrate to the primary waveguide 110.

The drop port 122 is configured to emit the optical signal from the core of the redundant waveguide 120 to the second PD 150b. In some embodiments, a grating coupler is included at the drop port 122 to output the optical signal to the second PD 150b. In some embodiments, an edge coupler with a lens or a curvature is included at the drop port 122 in order to improve coupling between the core of the redundant waveguide 120 and the second PD 150b and to reduce cross-talk between adjacent PDs by minimizing an amount of the optical signal that is incident on the adjacent PDs. In some embodiments, a coating, such an AR coating, is on the drop port 122 in order to maximize an intensity of the optical signal coupled to the second PD 150b.

The add port 124 is configured to not be in use during normal operation of photonic device 100. In some embodiments, a coating, such as an absorptive coating, is placed over the add port 124 to reduce an amount of light emitting from the add port 124 as a result of backscatter within the redundant waveguide 120 to help reduce stray light from being incident on either the first PD 150a or the second PD 150b. In some embodiments, the add port 124 is positioned to reduce the risk of stray light emitted from the add port 124 being incident on either the first PD 150a or the second PD 150b.

The resonant structure 130 is configured to selectively couple the primary waveguide 110 to the redundant waveguide 120. The resonant structure 130 is positioned close to, but not in contact with, each of the primary waveguide 110 and the redundant waveguide 120. A size of the gap between the resonant structure 130 and each of the primary waveguide 110 and the redundant waveguide 120 determines the coupling efficiency between the resonant structure 130 and the corresponding waveguide. In addition to the gap, optical properties, such as refractive index, also impact coupling efficiency. Light coupled from the primary waveguide 110 into the resonant structure 130 travels in a counter-clockwise direction, based on the arrow at the input port 112. The light intensifies due to constructive interference within the resonant structure 130. The light is then able to be coupled from the resonant structure 130 into the redundant waveguide 120 and output in the direction indicated by the arrow at the drop port 122.

Materials and cross-sectional shape of the resonant structure 130 are similar to the primary waveguide 110. In some embodiments, a core material of the resonant structure 130 is a same material as the core material for both the primary waveguide 110 and the redundant waveguide 120. In some embodiments, the core material of the resonant structure 130 is different from at least one of the core material of the primary waveguide 110 or the core material of the redundant waveguide 120. In some embodiments, a cladding material of the resonant structure 130 is a same material as the cladding material for both the primary waveguide 110 and the redundant waveguide 120. In some embodiments, the cladding material of the resonant structure 130 is different from at least one of the cladding material of the primary waveguide 110 or the cladding material of the redundant waveguide 120. In some embodiments, the cladding material of the resonant structure 130 is continuous with the cladding material of at least one of the primary waveguide 110 or the redundant waveguide 120.

In some embodiments, the resonant structure 130 is on a same plane, i.e., a same distance from the substrate, as at least one of the primary waveguide 110 or the redundant waveguide 120. In some embodiments, the resonant structure 130 is closer to the substrate than at least one of the primary waveguide 110 or the redundant waveguide 120. In some embodiments, the resonant structure is farther from the substrate than at least one of the primary waveguide 110 or the redundant waveguide 120. In some embodiments, the resonant structure 130 is between the primary waveguide 110 and the redundant waveguide 120 in direction extending away from the substrate. In some embodiments, the resonant structure 130 overlaps at least one of the primary waveguide 110 or the redundant waveguide 120 in a plan view. In situations where the resonant structure 130 is on a different plane from at least one of the primary waveguide 110 or the redundant waveguide 120, the vertical separation is also included in determining the gap.

In some embodiments, the resonant structure 130 is a ring structure. In some embodiments, the resonant structure 130 includes reflective gratings within to adjust a direction of propagation of light within the resonant structure 130, i.e., to change counter-clockwise propagation to clockwise propagation.

In some embodiments, a cross-sectional dimension of the resonant structure 130 is a same as a cross-sectional dimension of each of the primary waveguide 110 and the redundant waveguide 120. In some embodiments, the cross-sectional dimension of the resonant structure 130 is different from a cross-sectional dimension of the primary waveguide 110 or a cross-sectional dimension of the redundant waveguide 120.

The controller 140 is configured to actively control coupling between the resonant structure 130 and both of the primary waveguide 110 and the redundant waveguide 120. The controller 140 is connected to the control element 142 in order to actively control the resonant structure 130 in order to control coupling. The controller is configured to receive information from each of the first PD 150a and the second PD 150b in order to determine whether the optical signal incident on the input port 112 is being efficiently converted, e.g., by measuring current between the first PD 150a and the electronic circuit 160, into an electrical signal usable by the electronic circuit 160. In response to a determination that the first PD 150a is efficiently converting the optical signal from input port 112 to an electrical signal for the electronic circuit 160, the controller 140 controls the control element 142 to reduce or minimize coupling between the resonant structure 130 and the primary waveguide 110 so that a maximum amount of the optical signal incident on input port 112 continues to through port 114. In response to a determination that the first PD 150a is not efficiently converting, e.g., by measuring the current between the first PD 150a and the electronic circuit 160, the optical signal to an electrical signal usable by the electronic circuit 160, the controller 140 controls the control element 142 in order to increase or maximize coupling between the resonant structure 130 and each of the primary waveguide 110 and the redundant waveguide 120. As a result, an increased amount of the optical signal received at the input port 112 will be coupled into the redundant waveguide 120, through the resonant structure 130, and emitted onto the second PD 150b by the drop port 122.

In addition to controlling coupling during operation, the controller 140 is also usable to tune the resonant structure 130 prior to normal operation. As noted above, silicon is sensitive to processing and optical properties of the primary waveguide 110, the redundant waveguide 120 and/or the resonant structure 130 are altered during processing subsequent to formation of these components, in some instances. As a result, coupling between the components will be different than an initial design in some instances. The controller 140 is configured to control the control element 142 in order to determine maximum and minimum coupling values by measuring efficiency of converting optical signals to electrical signals by each of the first PD 150a and the second PD 150b, e.g., by measuring currents. The parameters of the control element 142 that produce the maximum and minimum coupling values are stored for use by the controller during later operation of the photonic device 100. In some embodiments, the tuning is re-performed periodically to account for variations in the performance of the photonic device 100 over time.

The control element 142 is controlled by the controller 140 in order to adjust the coupling between the resonant structure 130 and each of the primary waveguide 110 and the redundant waveguide 120. In some embodiments, the control element 142 is a thermal element, such as a resistor. In some embodiments, the control element 142 is an electrical field producing element, such as an inductor. Thermal control of the resonant structure 130 impacts optical properties, such as refractive index, of the resonant structure 130. Electrical field control of the resonant structure 130 impacts optical properties, such as refractive index. The photonic device 100 includes a single control element 142. However, in some embodiments, additional control elements are included. In some embodiments, at least one control element 142 is positioned to impact each of the primary waveguide 110, the redundant waveguide 120 and/or the resonant structure 130.

The first PD 150a is configured to receive the optical signal emitted from the through port 114. The first PD 150a is configured to convert the received optical signal into an electrical signal and transfer that electrical signal to the electronic circuit 160. In some embodiments, the first PD 150a includes a photodiode. In some embodiments, the first PD 150a includes an isolation structure to reduce cross-talk between the first PD 150a and adjacent PDs.

The second PD 150b is configured to receive the optical signal emitted from the drop port 122. The second PD 150b is configured to convert the received optical signal into an electrical signal and transfer that electrical signal to the electronic circuit 160. In some embodiments, the second PD 150b includes a photodiode. In some embodiments, the second PD 150b includes an isolation structure to reduce cross-talk between the second PD 150b and adjacent PDs. In some embodiments, the second PD 150b abuts the first PD 150a. In some embodiments, the second PD 150b is spaced from the first PD 150a. In some embodiments, the second PD 150b is adjacent to the first PD 150a. In some embodiments, another PD is between the second PD 150b and the first PD 150a.

The electronic circuit 160 is configured to receive electrical signals from the first PD 150a and the second PD 150b. The electronic circuit 160 is configured to use the electrical signals to perform a function for implementation of a designed functionality of the IC. In some embodiments, the electronic circuit 160 includes memory, logic circuitry or other suitable components.

The above description is directed to the photonic device 100 receiving an optical signal and transferring the optical signal to the electronic circuit 160 through first PD 150a and/or second PD 150b. One of ordinary skill in the art would recognize that the photonic device 100 is also capable of functioning to receive an optical signal at either drop port 122 or through port 114 and emitting that signal out of input port 112. In such a configuration, the first PD 150a and the second PD 150b would be replaced with optical transmitting elements that receive an electrical signal from the electronic circuit 160; convert that electrical signal to an optical signal, and emit the optical signal into the drop port 122 or the through port 114. The resonant structure 130 would then selectively couple the redundant waveguide 120 to the primary waveguide 110 based on a signal from the controller 140 to emit the optical signal from the input port 112 to an external device or to another component in the IC. One of ordinary skill in the art would understand this configuration based on the above description of the functionality of the photonic device 100, so additional drawings and description of this configuration are omitted for the sake of brevity. One of ordinary skill in the art would recognize that similar modifications are possible with other Figures described below. For example, multiplexers (MUX) are configurable as de-multiplexers (DEMUX) based on reversing the direction of propagation for the optical signals within the MUX.

Figure 2:
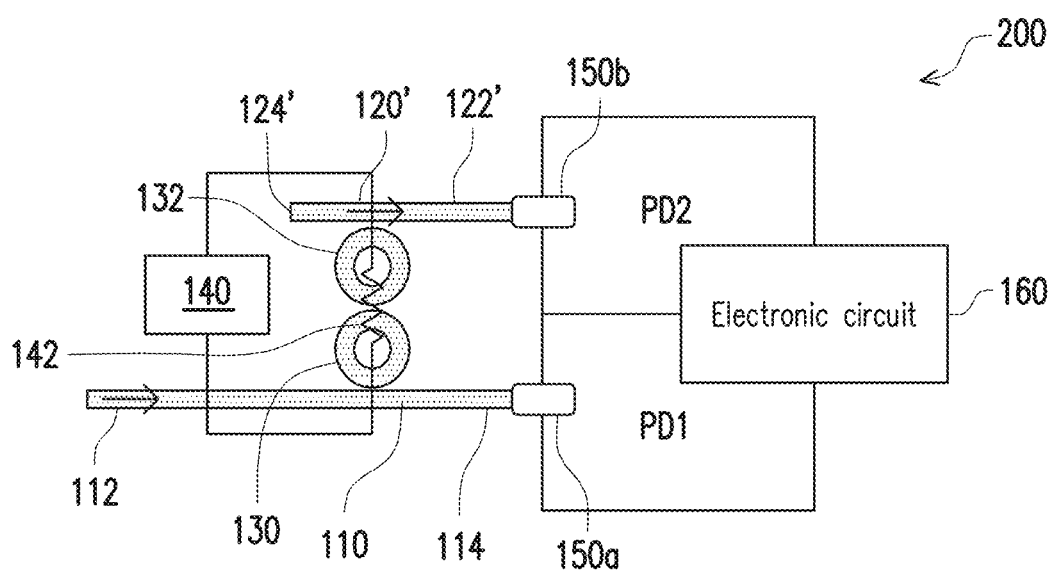
FIG. 2 is a schematic view of a photonic device in an IC in accordance with some embodiments.

FIG. 2 is a schematic view of a photonic device 200 in an IC in accordance with some embodiments. The photonic device 200 is similar to the photonic device 100. In comparison with the photonic device 100, the photonic device 200 includes a second resonant structure 132. The second resonant structure 132 is similar to the resonant structure 130. In some embodiments, the materials, size and/or shape of the second resonant structure 132 is a same as the resonant structure 130. In some embodiments, the second resonant structure 132 differs from the resonant structure in at least one of material, size and/or shape. In some embodiments, a cladding of the second resonant structure 132 is continuous with the cladding of the resonant structure 130.

The inclusion of second resonant structure 132 in photonic device 200 results in a re-arrangement of the redundant waveguide 120 (FIG. 1) to have the arrangement of a redundant waveguide 120'. An optical signal coupled from the primary waveguide 110 to the redundant waveguide 120' through the resonant structure 130 and the second resonant structure 132 would propagate through the redundant waveguide 120' in an opposite direction as that in the redundant waveguide 120 (FIG. 1). That is, the optical signal would travel counter-clockwise through the resonant structure 130, as in photonic device 100, then travel clockwise through the resonant structure 132 before being coupled into the redundant waveguide 120'.

Photonic device 200 includes a single control element 142. In some embodiments, multiple control elements are included in photonic device 200 in order to individually control resonant structure 130 and second resonant structure 132. Similar to coupling between the resonant structure 130 and the primary waveguide 110 and the redundant waveguide 120 described with respect to photonic device 100 (FIG. 1), coupling between the resonant structure 130 and the second resonant structure 132 is controlled based on the optical properties and the gap between these components.

Figure 3:
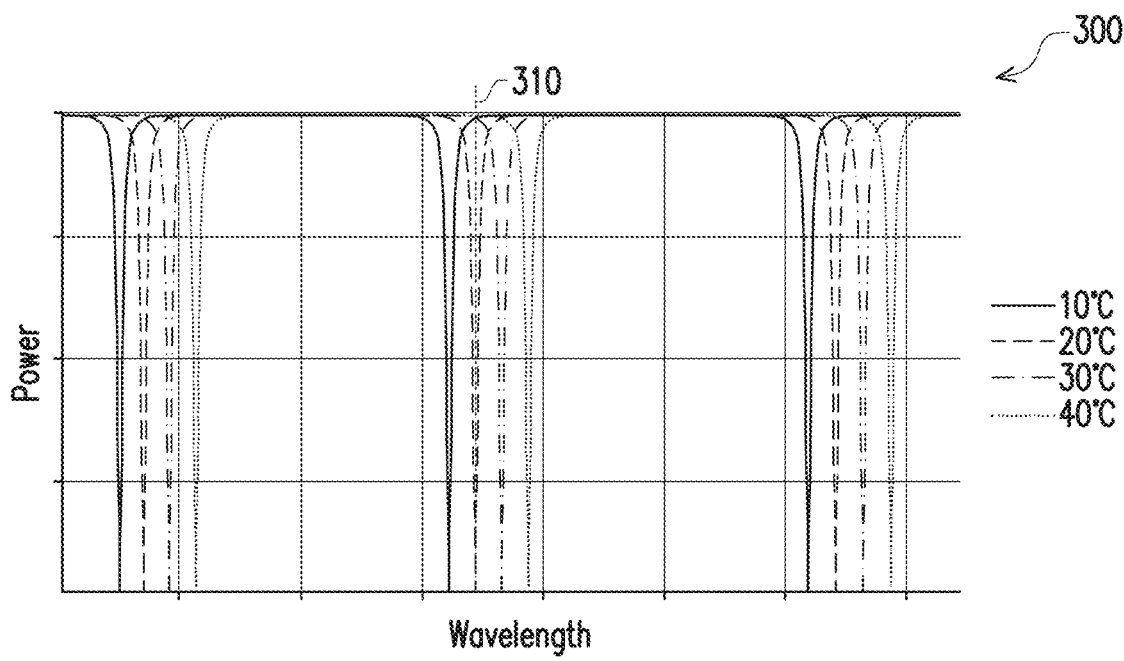
FIG. 3 is a graph of optical signal power versus wavelength for a resonant structure at different temperatures in accordance with some embodiments.

FIG. 3 is a graph 300 of optical signal power versus wavelength for a resonant structure at different temperatures in accordance with some embodiments. As discussed above, coupling efficiency between a resonant structure, e.g., resonant structure 130 (FIG. 1), and a waveguide, e.g., primary waveguide 110 (FIG. 1), is controllable using a thermal control element for controlling a temperature of the resonant structure. The graph 300 includes multiple peak coupling for each temperature of the resonant structure. A wavelength of the optical signal is indicated by design wavelength 310 in the graph 300. A coupling peak at the design wavelength 310 is achieved when the resonant structure is at a temperature of 20° C.

As a result, during operation, if coupling between the resonant structure and the waveguide is desired, the temperature of the resonant structure would be controlled to be 20° C. In contrast, if coupling is to be avoided, the temperature of the resonant structure would be controlled to be different from 20° C. Using photonic device 100 as an example, controller 140 would drive control element 142 to set the temperature of resonant structure 130 to be 20° C. in order to have the optical signal output at drop port 122, and would drive the control element 142 to set the temperature of resonant structure 130 to be different from 20° C. to have the optical signal output at through port 114. Determination of coupling peaks and the associated temperatures are determinable by a controller, e.g., the controller 140 (FIG. 1), using the tuning process described above.

Figure 4:
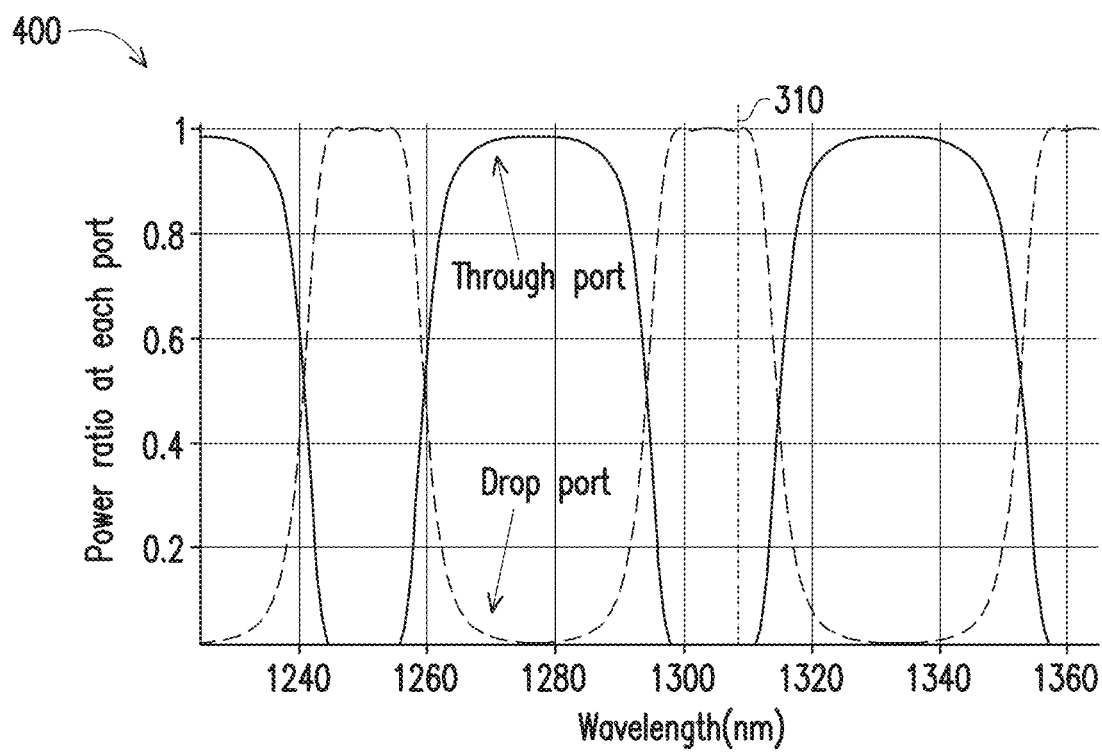
FIG. 4 is a graph of a power ratio for an optical signal at different ports of a photonic device versus wavelength in accordance with some embodiments.

FIG. 4 is a graph 400 of a power ratio for an optical signal at different ports of a photonic device versus wavelength in accordance with some embodiments. The graph 400 indicates that an output power at a through port is inversely related to an output power at a drop port. That is, when the output power at the through port is at a maximum value, the output power at the drop port is at a minimum value. The output power is related to coupling of a resonant structure, e.g., resonant structure 130 (FIG. 1), with waveguides, e.g., primary waveguide 110 and/or redundant waveguide 120. When the resonant structure is coupled to the two waveguides, then the optical signal is transferred to the drop port. When the resonant structure is not coupling the two waveguides, then the optical signal is maintained in the primary waveguide and propagates to the through port.

Looking at the output power ratio at the design wavelength 310, the output power at the drop port is a maximum value and the output power at the through port is at a minimum power. Using the graph 300 (FIG. 3) and the photonic device 100 (FIG. 1) as an example, the controller 140 drives the control element 142 to have the resonant structure have a temperature of 20° C. As a result, the optical signal from input port 112 is coupled to the redundant waveguide 120 through the resonant structure 130 to be output at drop port 122. This example produces the output power ratio of graph 400 at design wavelength 310. One of ordinary skill in the art would recognize that other design wavelengths are possible. One of ordinary skill in the art would further recognize that the tuning and control described above are applicable to numerous photonic devices and detailed discussion of how the tuning and control are achievable are not repeated below for the sake of brevity.

Figure 5:
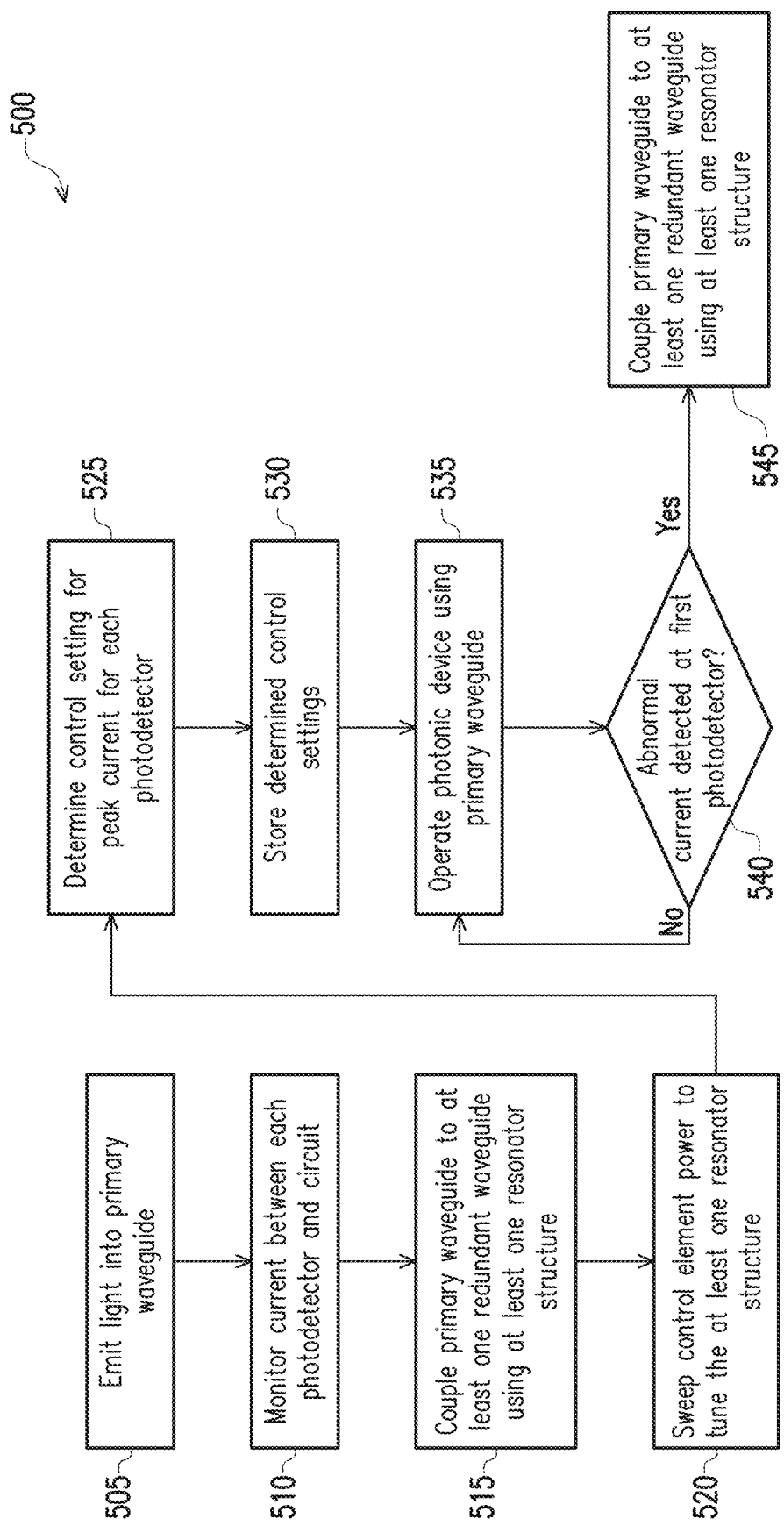
FIG. 5 is a flow chart of a method of using a photonic device in an IC in accordance with some embodiments.

FIG. 5 is a flow chart of a method 500 of using a photonic device in an IC in accordance with some embodiments. The method 500 is usable to tune and operate the photonic device 100 (FIG. 1), the photonic device 200 (FIG. 2) or other photonic devices including redundant waveguides.

In operation 505, light is emitted into the primary waveguide, e.g., the primary waveguide 110 (FIG. 1). In some embodiments, the light is emitted from a component of the IC including the photonic device. In some embodiments, the light is emitted from an external device. In some embodiments, the light includes a single wavelength. In some embodiments, the light includes multiple wavelengths.

In operation 510, a current between each PD of the photonic device and the electronic circuit is monitored. In some embodiments, the current is monitored using an ammeter. In some embodiments, the current information is provided to a controller, e.g., the controller 140 (FIG. 1), of the photonic device. In some embodiments, the operation 510 is performed continuously throughout the method 500 in order to provide feedback on a status of the photonic device.

In operation 515, the primary waveguide is coupled to at least one redundant waveguide using at least one resonant structure. In some embodiments, the controller, e.g., the controller 140 (FIG. 1), drives at least one control element, e.g., the control element 142 (FIG. 1), in order to couple the primary waveguide to the at least one redundant waveguide. In some embodiments, the control element is a thermal control element. In some embodiments, the control element is a voltage control element. In some embodiments, the primary waveguide is passively coupled to the at least one redundant waveguide through the at least one resonator structure.

In operation 520, the control element is swept across a range of values to tune the at least one resonator structure. The current between each of the PDs and the electronic circuit is measured during operation 520 in order to determine the path the optical signal is taking for each of the values for the control element. In some embodiments, the controller, e.g., the controller 140 (FIG. 1), electrically controls the control element, e.g., the control element 142 (FIG. 1), in order to set the control element at a variety of different values. In some embodiments, the controller drives the control element to change a temperature of the at least one resonant structure. In some embodiments, the controller drives the control element to change an electrical field applied to the at least one resonant structure. In some embodiments that include multiple resonator structures, multiple control elements are swept in order to determine the path of the optical signal for different combinations of values for the control elements.

In operation 525, a control setting is determined that produces peak current for each PD. Based on the data collected during operation 520, a determination is made regarding which settings produce maximum currents between each of the PDs and the electronic circuit. For example, as seen in the graph 300 (FIG. 3), different temperature values produce different peak values. Identifying the value, e.g., 20° C. (FIG. 3), which produces the maximum coupling at the design wavelength helps the photonic device to accurately switch between the primary waveguide and the redundant waveguide during operation of the photonic device. In some embodiments that include multiple resonant structures, multiple control values are identified as producing peak values for different PDs.

In operation 530, the control settings are stored in a memory. In some embodiments, the time at which the control settings are stored are also stored in the memory. In some embodiments, after a predetermined period of time, operations 510-530 are repeated in order to account for any changes in the performance of the photonic device due to oxidation or moisture penetration for example. Updating the control settings to account for variations in the photonic device helps to ensure that the photonic device continues to operate at maximum performance during the useful life of the photonic device.

In operation 535, the photonic device is operated using the primary waveguide. The primary waveguide, e.g., the primary waveguide 110 (FIG. 1), receives an optical signal at an input port, e.g., the input port 112 (FIG. 1), and transfers that incident light to a first PD, e.g., the first PD 150a (FIG. 1), via a through port, e.g., the through port 114 (FIG. 1). The first PD receives the optical signal and converts the optical signal into an electrical signal, which is then transferred to the electronic circuit, e.g., the electronic circuit 160 (FIG. 1). A current of the electrical signal between the first PD and the electronic circuit is monitored, for example, using operation 510, during operation 535.

In operation 540, a determination is made regarding whether an abnormal current is detected at the first PD. The abnormal current indicates that communication of the signal from the input port, e.g., the input port 112 (FIG. 1) of the primary waveguide, e.g., the primary waveguide 110 (FIG. 1) to the electronic circuit, e.g., the electronic circuit 160 (FIG. 1), includes a flaw. The abnormal current is identified in response to the current between the first PD, e.g., the first PD 150a (FIG. 1), and the electronic circuit being different from an expected value. The expected value is based on an intensity of the light emitted to be received by the input port of the primary waveguide. In some embodiments, current values obtained during a latest iteration of operation 520 are used as the expected value. In some embodiments, a tolerance threshold is applied to the expected value in order to help account for minor variations and imperfections in the photonic device. For example, if the primary waveguide is damaged and light is leaked from the primary waveguide less of the optical signal will reach the first PD. As a result, the current between the first PD and the electronic circuit will be lower than expected. In another example, if current is leaking into the electronic circuit from another PD near the first PD, the current between the first PD and the electronic circuit will be higher than expected. In both situations, the electrical signal received by the electronic circuit is not an accurate representation of the information to be used by the electronic circuit. In some embodiments, this determination is made by the controller, e.g., the controller 140 (FIG. 1).

In response to a determination that no abnormal current is detected, the method 500 returns to operation 535 and continues to operate as normal.

In response to a determination that an abnormal current is detected, the method 500 proceeds to operation 545, in which the primary waveguide is coupled to the at least one redundant waveguide using the at least one resonant structure. Using the control setting stored in operation 530, the photonic device is able to precisely and accurately couple the optical signal into the at least one redundant waveguide, e.g., the redundant waveguide 120 (FIG. 1). Once the optical signal is coupled to the at least one redundant waveguide, the electronic circuit, e.g., the electronic circuit 160 (FIG. 1), will begin receiving an electrical signal from the PD(s), e.g., the second PD 150*b* (FIG. 1), optically connected to the at least one redundant waveguide.

One of ordinary skill in the art would recognize that the method 500 is usable to operate numerous photonic devices including the photonic device 100 (FIG. 1), the photonic device 200 (FIG. 2), as well as other photonic devices including some photonic devices described below. In some embodiments, an order of operations in the method 500 is altered. For example, in some embodiments, operation 510 is performed after operation 515. In some embodiments, additional operations are included in the method 500. For example, in some embodiments, operations 510-530 are repeated periodically to account for drift in the photonic device. In some embodiments, at least one operation of the method 500 is omitted. For example, in some embodiments, the operation 515 is omitted or combined with operation 520.

In some embodiments, the method 500 is used to split the optical signal between two PDs, e.g., the first PD 150*a* and the second PD 150*b* (FIG. 1), in order to increase the overall power receivable by the electronic circuit, e.g., electronic circuit 160 (FIG. 1), with minimal degradation.

Figure 6:
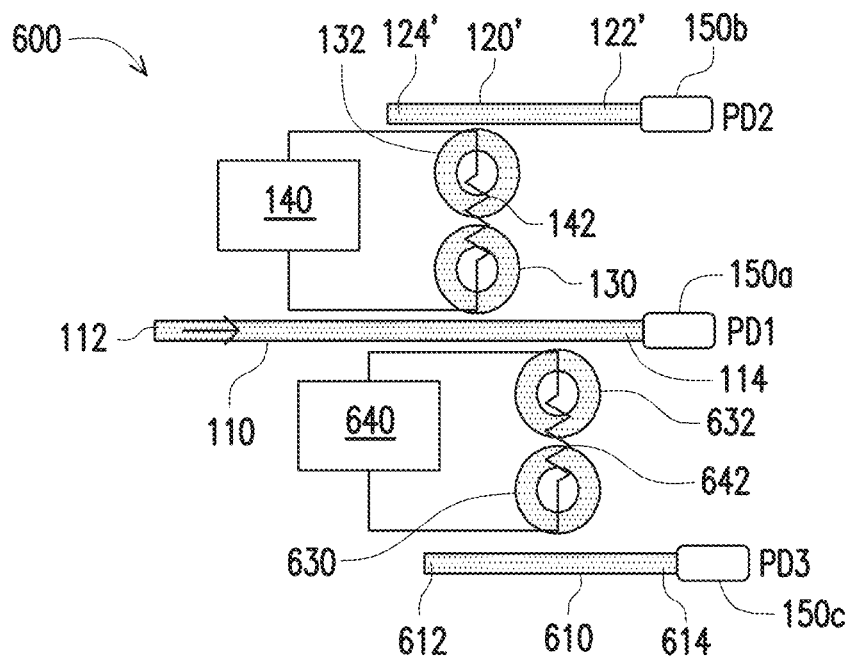
FIG. 6 is a schematic view of a photonic device in an IC in accordance with some embodiments.

FIG. 6 is a schematic view of a photonic device 600 in an IC in accordance with some embodiments. The photonic device 600 is similar to the photonic device 200 (FIG. 2). The electronic circuit 160 (FIG. 2) is not included as part of FIG. 6, but one of ordinary skill in the art would recognize that the PDs of the photonic device 600 are connected to an electronic circuit. In comparison with the photonic device 200 (FIG. 2), the photonic device includes a second redundant waveguide 610, a third resonant structure 630, a fourth resonant structure 632, a second controller 640, a second control element 642, and a third PD 150*c*.

The second redundant waveguide 610 is on an opposite side of the primary waveguide 110 from the redundant waveguide 120'. The second redundant waveguide 610 includes an add port 612 and a drop port 614. The drop port is optically connected to the third PD 150*c*. In some embodiments, the second redundant waveguide 610 is on a same side of the primary waveguide 110 as the redundant waveguide 120'.

The third resonant structure 630 and the fourth resonant structure 632 are independently similar to the resonant structure 130. In some embodiments, the materials, size and/or shape of the third resonant structure 630 and the fourth resonant structure 632 are the same as the resonant structure 130. In some embodiments, at least one of the third resonant structure 630 or the fourth resonant structure 632 differs from the resonant structure 130 in at least one of material, size and/or shape. In some embodiments, a cladding of the third resonant structure 630 and the fourth resonant structure 632 is continuous with the cladding of the resonant structure 130. In some embodiments, the fourth resonant structure 632 is omitted. In some embodiments where the fourth resonant structure 632 is omitted, the second redundant waveguide 610 is arranged in a manner similar to the redundant waveguide 120 (FIG. 1) to account for the direction of propagation of the optical signal. In some embodiments, the fourth resonant structure 642 and the second resonant structure 132 are both omitted and the redundant waveguide 120' and the second redundant waveguide 610 are adjusted accordingly. While the photonic device 600 includes two resonant structures on each side of the primary waveguide 110, one of ordinary skill in the art would recognize that an arrangement with a different number of resonant structures on each side of the primary waveguide 110 is possible. For example, in some embodiments, one resonant structure is on a first side of the primary waveguide 110 and three resonant structures are on a second side of the primary waveguide 110.

The second controller 640 is similar to the controller 140. In some embodiments, the second controller and the controller 140 are combined into a single controller. In some embodiments, the single controller would maintain the ability to independently drive control element 142 and the second control element 642.

The second control element 642 is similar to the control element 142. In some embodiments, the second control element 642 includes a first type of control element and the control element 142 includes a second type of control element different from the first type. For example, in some embodiments, the control element 142 is a thermal control element and the second control element 642 is an electrical control element. In some embodiments, the control element 142 and the second control element 642 are a same type of control element. For example, in some embodiments, both the control element 142 and the second control element 642 are thermal control elements. In some embodiments, the control element 142 and the second control element 642 are integrated into a single control element.

The third PD 150*c* is configured to receive the optical signal from the drop port 614. The third PD 150*c* is configured to convert the optical signal into an electrical signal and transfer the electrical signal to an electronic circuit, e.g., the electronic circuit 160 (FIG. 2). In some embodiments, the third PD 150*c* is a same PD as the first PD 150*a* and the second PD 150*b*. In some embodiments, the third PD 150*c* is different from at least one of the first PD 150*a* or the second PD 150*b*.

Figure 7:
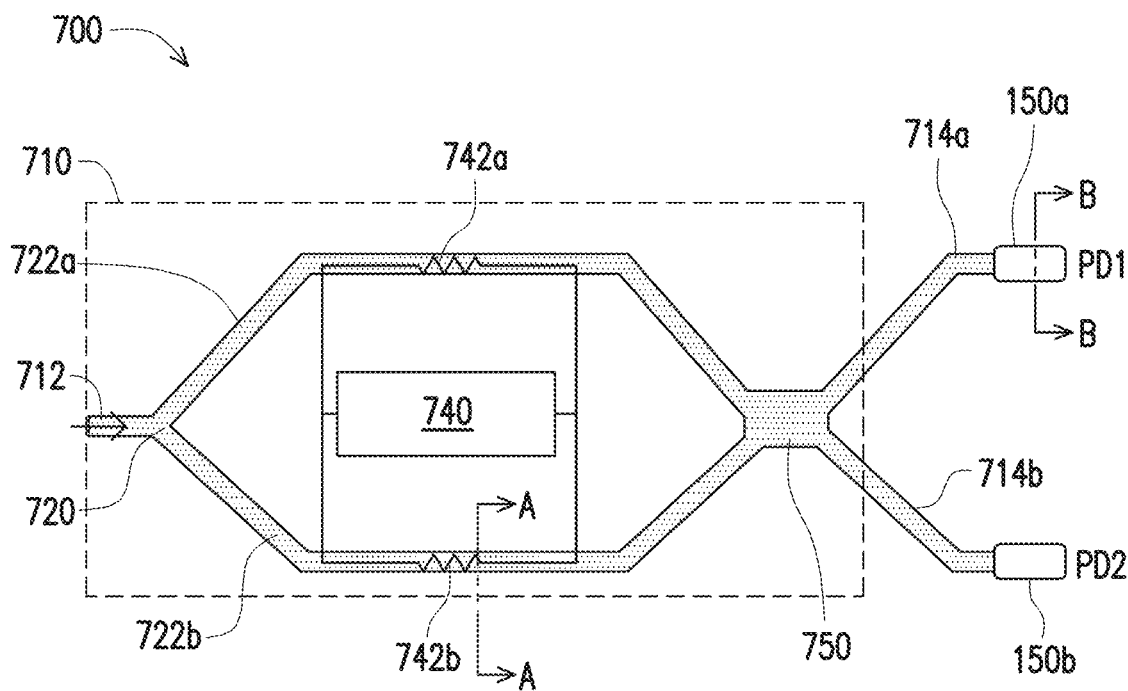
FIG. 7 is a schematic view of a photonic device in an IC in accordance with some embodiments.

FIG. 7 is a schematic view of a photonic device 700 in an IC in accordance with some embodiments. The photonic device 700 has a Mach Zehnder Interferometer (MZI) arrangement 710. The MZI arrangement 710 includes an input port 712 configured to receive an optical signal. A first beam splitter 720 is configured to split the optical signal between a first arm 722*a* and a second arm 722*b*. A controller 740 is configured to drive a first control element 742*a* for controlling propagation of the split optical signal along the first arm 722*a* and to drive a second control element 742*b* for controlling propagation of the split optical signal along the second arm 722*b*. A second beam splitter 750 is configured to split each of the split optical signal along the first arm 722*a* and the split optical signal along the second arm 722*b*. A first through port 714*a* is configured to carry the optical signal from the second beam splitter 750 to the first PD 150*a*. A second through port 714*b* is configured to carry the optical signal from the second beam splitter 750 to the second PD 150b. The electronic circuit 160 (FIG. 2) is not included as part of FIG. 7, but one of ordinary skill in the art would recognize that the PDs of the photonic device 700 are connected to an electronic circuit.

The input port 712 is similar to the input port 112 (FIG. 1). Each of the first through port 714a and the second through port 714b are similar to the through port 114 (FIG. 1). The controller 740 is similar to the controller 140 (FIG. 1). In comparison with the controller 140, the controller 740 is configured to independently drive the first control element 742a and the second control element 742b. Each of the first arm 722a and the second arm 722b are similar to the primary waveguide 110 (FIG. 1). In some embodiments, each of the first control element 742a and the second control element 742b are similar to the control element 142 (FIG. 1). In some embodiments, at least one of the first control element 742a or the second control element 742b includes a PIN phase shifter.

The first beam splitter 720 is configured to split the input optical signal into a first portion propagating along the first arm 722a and into a second portion propagating along the second arm 722b. In some embodiments, the first beam splitter 720 is a 50-50 beam splitter meaning that half of the optical signal received by the first beam splitter 720 is transferred to each of the first arm 722a and the second arm 722b.

The second beam splitter 750 is configured to combine and split the optical signal from each of the first arm 722a and the second arm 722b into the first drop port 714a and the second drop port 714b. In some embodiments, the second beam splitter 750 is a 50-50 beam splitter. In some embodiments, the second beam splitter 750 includes both a beam combining and a beam splitting element. That is, in some embodiments, the optical signal from each of the first arm 722 and the second arm 722b are combined and then split into two optical paths. One of the optical paths being along the first drop port 714a and the other of the optical paths being along the second drop port 714b.

In comparison to the photonic device 100 (FIG. 1), selectively directing the optical signal to the first PD 150a or the second PD 150b is implemented by phase control of the optical signals propagating along each of the first arm 722a and the second arm 722b. The first control element 742a is configured to slow a rate of propagation of the optical signal along arm 722a. Slowing the rate of propagation changes the phase the wave of the optical signal from the first arm 722a that reaches the second splitter 750. The change in the phase results in destructive interference with the optical signal from the second arm 722b, which reduces the intensity of the optical signal along one of the first drop port 714a or the second drop port 714b. The second control element 742b operates similarly along the second arm 722b. By controlling the first control element 742a and the second control element 742b, the controller is able to modulate the amount of light along each of the first drop port 714a and the second drop port 714b by regulating the interference pattern at the second splitter 750.

Figure 8:
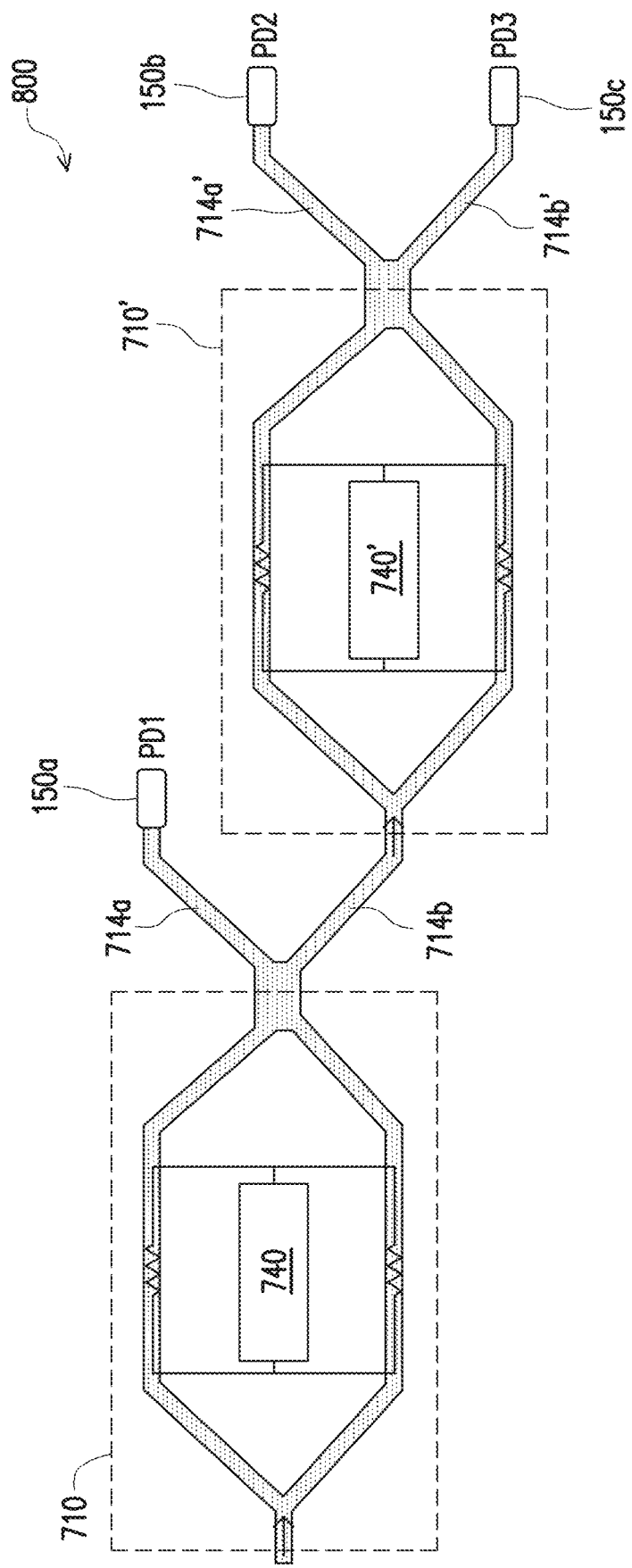
FIG. 8 is a schematic view of a photonic device in an IC in accordance with some embodiments.

FIG. 8 is a schematic view of a photonic device 800 in an IC in accordance with some embodiments. The photonic device 800 is similar to the photonic device 700 (FIG. 7). In comparison with the photonic device 700 (FIG. 7), the photonic device includes a second MZI 710' connected to the second drop port 714b of the MZI 710. A third drop port 714a' exiting the second MZI 710' is optically connected to the second PD 150b. A fourth drop port 714b' exiting the second MZI 710' is optically connected to the third PD 150c. The electronic circuit 160 (FIG. 2) is not included as part of FIG. 8, but one of ordinary skill in the art would recognize that the PDs of the photonic device 800 are connected to an electronic circuit.

The second MZI 710' is similar to the MZI 710. In some embodiments, the second MZI 710' includes the same type of control elements as the MZI 710. In some embodiments, the second MZI 710' includes different types of control elements as the MZI 710. By connecting the second MZI 710' in series with the MZI 710, a number of PDs that the optical signal is able to be directed toward increases providing increased flexibility for the photonic device 800 in comparison with photonic devices having fewer PDs.

Figure 9:
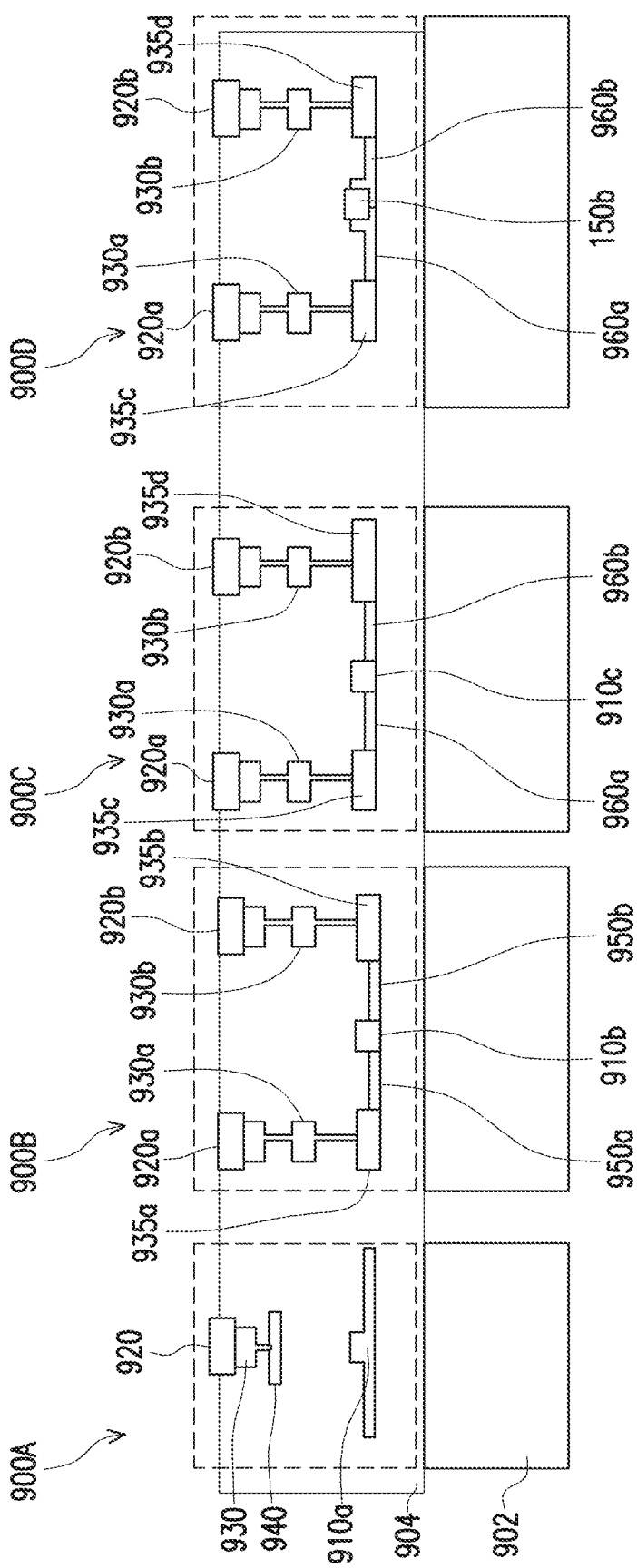
FIGS. 9A-9D are cross-sectional views of photonic devices for an IC in accordance with some embodiments.

FIGS. 9A-9D are cross-sectional views of photonic devices for an IC in accordance with some embodiments. FIG. 9A is a cross-sectional view of a photonic device 900A taken along line A-A of FIG. 7 in accordance with some embodiments. Once of ordinary skill in the art would recognize that while the photonic device 900A is along line A-A of FIG. 7, the structure of the photonic device 900A is usable in other photonic devices, such as the photonic device 100 (FIG. 1), the photonic device 200 (FIG. 2), the photonic device 600 (FIG. 6), the photonic device 800 (FIG. 8) or other photonic devices.

The photonic device 900A includes a substrate 902 and a dielectric layer 904 over the substrate 902. A waveguide 910a extends through the dielectric layer 904. A contact 920 is over the dielectric layer 904 and is electrically connected to a heater 940 through an interconnect structure 930. The heater 940 and the interconnect structure 930 are in the dielectric layer 904. The heater 940 is sufficiently close to the waveguide 910 to be able to change the temperature of the waveguide 910 in order to adjust the optical properties of the waveguide 910 and/or the size of the waveguide 910 based on the coefficient of thermal expansion of the waveguide 910.

The substrate 902 includes a silicon substrate. The dielectric layer 904 provide electrical isolation between elements of the IC, and acts as a cladding for the waveguide 910a. One of ordinary skill in the art would understand that dielectric layer 904 extending across the substrate 902 would also surround the first arm 722a of the photonic device (FIG. 7). Thus, the cladding around the first arm 722a and the second arm 722b is continuous. Similar continuous cladding arrangements are possible in other photonic devices, as described in this disclosure. In some embodiments, the dielectric layer 904 includes silicon oxide. The waveguide 910a is the second arm 722b of the photonic device 700 (FIG. 7). In some embodiments, the waveguide 910 is a different waveguide in a different photonic device or a resonant structure, such as resonant structure 130 (FIG. 1) or another resonant structure. The contact 920 is an electrical contact for providing electrical connection between the heater 940 and other components, such as a controller, e.g., controller 140 (FIG. 1). The interconnect structure 930 is a combination of conductive lines and conductive vias to electrically connect the contact 920 and the heater 940. In some embodiments, the contact 940 is part of the interconnect structure 930. The heater 940 is configured to receive an electrical signal and convert the electrical signal into a thermal output. In some embodiments, the heater includes a resistive thermal element. The heater 940 is configured to function as the second control element 742b of the photonic device 700 (FIG. 7).

FIG. 9B is a cross-sectional view of a photonic device 900B taken along line A-A of FIG. 7 in accordance with some embodiments. Once of ordinary skill in the art would recognize that while the photonic device 900B is along line A-A of FIG. 7, the structure of the photonic device 900B is usable in other photonic devices, such as the photonic device 100 (FIG. 1), the photonic device 200 (FIG. 2), the photonic device 600 (FIG. 6), the photonic device 800 (FIG. 8) or other photonic devices. The substrate 902 and dielectric layer 904 are not labeled in FIG. 9B for the sake of simplicity of the drawing.

In comparison with photonic device 900A (FIG. 9A), the photonic device 900B includes waveguide 910b, two contacts 920a and 920b, two interconnect structure 930a and 930b, two highly doped regions 935a and 935b and two doped regions 950a and 950b. The waveguide 910b is similar to the waveguide 910a (FIG. 9A). The two contacts 920a and 920b are similar to the contact 920 (FIG. 9A). The two interconnect structures 930a and 930b are similar to the interconnect structure 930 (FIG. 9A).

The two highly doped regions 935a and 935b have a same dopant type. In some embodiments, the dopant type is p-type. In some embodiments, the dopant type is n-type. The highly doped region 935a is electrically connected to the contact 920a through the interconnect structure 930a. The highly doped region 935b is electrically connected to the contact 920b through the interconnect structure 930b.

The two doped regions 950a and 950b have a same dopant type. In some embodiments, the dopant type is p-type. In some embodiments, the dopant type is n-type. The two doped regions 950a and 950b have a same dopant type as the two highly doped regions 935a and 935b. A dopant concentration of each of the two doped regions 950a and 950b is lower than a dopant concentration of each of the two highly doped regions 935a and 935b. The doped region 950a extends from the highly doped region 935a toward the waveguide 910b. In some embodiments, the doped region 950a directly contacts the waveguide 910b. In some embodiments, the doped region 950a is separated from the waveguide 910b. The doped region 950b extends from the highly doped region 935b toward the waveguide 910b. In some embodiments, the doped region 950b directly contacts the waveguide 910b. In some embodiments, the doped region 950b is separated from the waveguide 910b. The highly doped regions 935a and 935b along with the doped regions 950a and 950b are configured to function as the second control element 742b of the photonic device 700 (FIG. 7).

FIG. 9C is a cross-sectional view of a photonic device 900C taken along line A-A of FIG. 7 in accordance with some embodiments. Once of ordinary skill in the art would recognize that while the photonic device 900C is along line A-A of FIG. 7, the structure of the photonic device 900C is usable in other photonic devices, such as the photonic device 100 (FIG. 1), the photonic device 200 (FIG. 2), the photonic device 600 (FIG. 6), the photonic device 800 (FIG. 8) or other photonic devices. The substrate 902 and dielectric layer 904 are not labeled in FIG. 9C for the sake of simplicity of the drawing.

In comparison with photonic device 900B (FIG. 9B), the photonic device 900C includes waveguide 910c, two highly doped regions 935c and 935d and the doped regions 960a and 960b. The waveguide 910c is similar to the waveguide 910a (FIG. 9A). The two contacts 920a and 920b are similar to the contact 920 (FIG. 9A). The two interconnect structures 930a and 930b are similar to the interconnect structure 930 (FIG. 9A).

The two highly doped regions 935c and 935d have opposite dopant types. The highly doped region 935c is electrically connected to the contact 920a through the interconnect structure 930a. The highly doped region 935d is electrically connected to the contact 920b through the interconnect structure 930b.

The two doped regions 960a and 960b have opposite dopant types. The doped region 960a has a same dopant type as the highly doped region 935c. In some embodiments, the dopant type is p-type. In some embodiments, the dopant type is n-type. The doped region 960b has a same dopant type as the highly doped region 935d. In some embodiments, the dopant type is p-type. In some embodiments, the dopant type is n-type. A dopant concentration of each of the two doped regions 960a and 960b is lower than a dopant concentration of each of the two highly doped regions 935c and 935d. The doped region 960a extends from the highly doped region 935c toward the waveguide 910c. In some embodiments, the doped region 960a directly contacts the waveguide 910c. In some embodiments, the doped region 960a is separated from the waveguide 910c. The doped region 960b extends from the highly doped region 935d toward the waveguide 910c. In some embodiments, the doped region 960b directly contacts the waveguide 910c. In some embodiments, the doped region 960b is separated from the waveguide 910c. The highly doped regions 935c and 935d along with the doped regions 960a and 960b are configured to function as the second control element 742b of the photonic device 700 (FIG. 7).

FIG. 9D is a cross-sectional view of a photonic device 900D taken along line B-B of FIG. 7 in accordance with some embodiments. Once of ordinary skill in the art would recognize that while the photonic device 900D is along line B-B of FIG. 7, the structure of the photonic device 900D is usable in other photonic devices, such as the photonic device 100 (FIG. 1), the photonic device 200 (FIG. 2), the photonic device 600 (FIG. 6), the photonic device 800 (FIG. 8) or other photonic devices. The substrate 902 and dielectric layer 904 are not labeled in FIG. 9D for the sake of simplicity of the drawing.

In comparison with photonic device 900C (FIG. 9C), the photonic device 900D includes electrical connections to the second PD 150b instead of a control element for a waveguide. In some embodiments, the second PD 150b is a germanium based PD. While the photonic device 900D is related to the second PD 150b, one of ordinary skill in the art would recognize that the photonic device 900D is also applicable to the first PD 150a, the third 150c and other PD structures.

The doped region 960a provides electrical connection between the second PD 150b and the contact 920a through the highly doped region 935c and the interconnect structure 130a. The doped region 960b provides electrical connection between the second PD 150b and the contact 920b through the highly doped region 935d and the interconnect structure 130b. The electrical connection to electronic circuit 160 (FIG. 1) is possible through contacts 920a and 920b.

Figure 10:
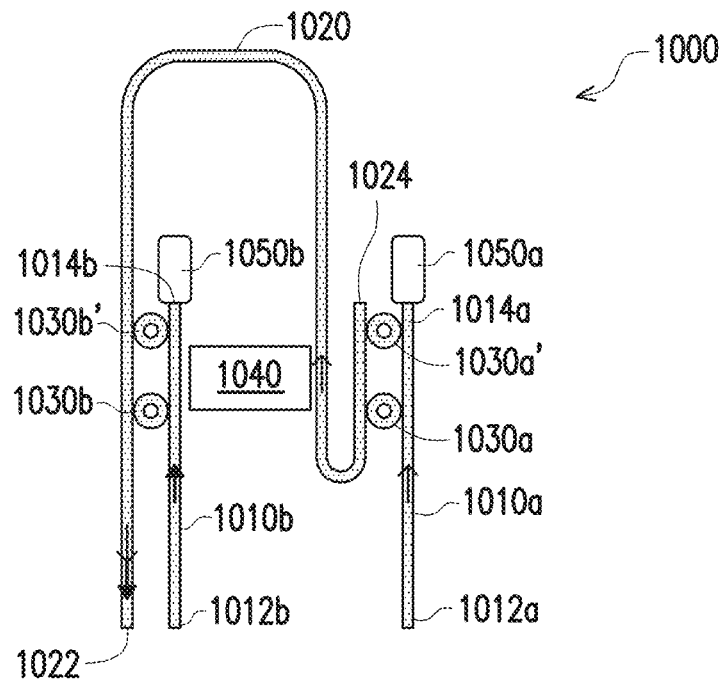
FIG. 10 is a schematic view of a photonic device in an IC in accordance with some embodiments.

FIG. 10 is a schematic view of a photonic device 1000 in an IC in accordance with some embodiments. The photonic device 1000 functions as a 2×1 multiplexer (MUX). The photonic device 1000 includes a first input waveguide 1010a configured to receive a first wavelength of light. The photonic device 1000 further includes a second input waveguide 1010b configured to receive a second wavelength of light different from the first wavelength of light. The photonic device 1000 further includes an output waveguide 1020 configured to output an optical signal including both the first wavelength of light and the second wavelength of light. A first resonant structure 1030a is configured to optically couple the first input waveguide 1010a to the output waveguide 1020. A first redundant resonant structure 1030*a*' is configured to optically couple the first input waveguide 1010*a* to the output waveguide 1020. A second resonant structure 1030*b* is configured to optically couple the second input waveguide 1010*b* to the output waveguide 1020. A second redundant resonant structure 1030*b*' is configured to optically couple the second input waveguide 1010*b* to the output waveguide 1020. A controller 1040 is configured to control coupling between the first input waveguide 1010*a* and the output waveguide 1020 through the first redundant resonant structure 1030*a*'. The controller 1040 is also configured to control coupling between the second input waveguide 1010*b* and the output waveguide 1020 through the second redundant resonant structure 1030*b*'. A first monitoring structure 1050*a* is configured to monitor an amount of light that remains in the first input waveguide 1010*a* following coupling by the first resonant structure 1030*a* and the first redundant resonant structure 1030*a*'. A second monitoring structure 1050*b* is configured to monitor an amount of light that remains in the second input waveguide 1010*b* following coupling by the second resonant structure 1030*b* and the second redundant resonant structure 1030*b*'.

The first input waveguide 1010*a* includes a first input port 1012*a* and a first through port 1014*a*. The second input waveguide 1010*b* includes a second input port 1012*b* and a second through port 1014*b*. Each of the first input port 1012*a* and the second input port 1012*b* is similar to the input port 112 (FIG. 1). Each of the first through port 1014*a* and the second through port 1014*b* are similar to the through port 114 (FIG. 1).

The output waveguide 1020 includes a drop port 1022 and an add port 1024. The drop port 1022 is similar to drop port 122 (FIG. 1). The add port 1024 is similar to the add port 124 (FIG. 1). One of ordinary skill in the art would recognize that a PD would be located an output of drop port 1022.

Each of the first resonant structure 1030*a*, the first redundant resonant structure 1030*a*', the second resonant structure 1030*b* and the second redundant resonant structure 1030*b*' is similar to the resonant structure 130 (FIG. 1). By including redundant resonant structures, such as the first redundant resonant structure 1030*a*' and the second redundant resonant structure 1030*b*', the photonic device 1000 is able to continue to function even if one resonant structure fails.

The controller 1040 is similar to the controller 140 (FIG. 1). While FIG. 10 does not include a control element for the sake of simplicity of the drawing, one of ordinary skill in the art would recognize that the photonic device 1000 includes at least one control element for controlling coupling through the first redundant resonant structure 1030*a*' and the second redundant resonant structure 1030*b*'. In some embodiments, a single controller 1040 controls all control elements in the photonic device 1000. In some embodiments, control elements are controlled by a separate controller 1040.

The first monitoring structure 1050*a* and the second monitoring structure 1050*b* are each able to receive light and convert the light into an electrical signal. In some embodiments, the first monitoring structure 1050*a* and the second monitor structure 1050*b* are PDs. In some embodiments, the first monitoring structure 1050*a* and the second monitoring structure 1050*b* include a grating coupler, a doped silicon region or another suitable structure capable of converting optical signals into electrical signals. One of ordinary skill in the art would recognize that electronic feedback, such as through an electronic circuit, e.g., electronic circuit 160 (FIG. 1), is used to notify the controller 1040 of a failure of light to be coupled out of either of the first input waveguide 1010*a* or the second input waveguide 1010*b*. Based on this feedback, the controller 1040 is able to drive one or more control elements to couple the first input waveguide 1010*a* to the output waveguide 1020 through the first redundant resonant structure 1030*a*' or couple the second input waveguide 1010*b* to the output waveguide 1020 through the second redundant resonant structure 1030*b*'. The active control arrangement provides a back-up resonant structure for maintaining operation of the photonic device 1000 even when one resonant structure fails. One of ordinary skill in the art would recognize that in some embodiments the controller 1040 also drives at least one control element to help tune coupling using first resonant structure 1030*a* and/or second resonant structure 1030*b*.

Figure 11:
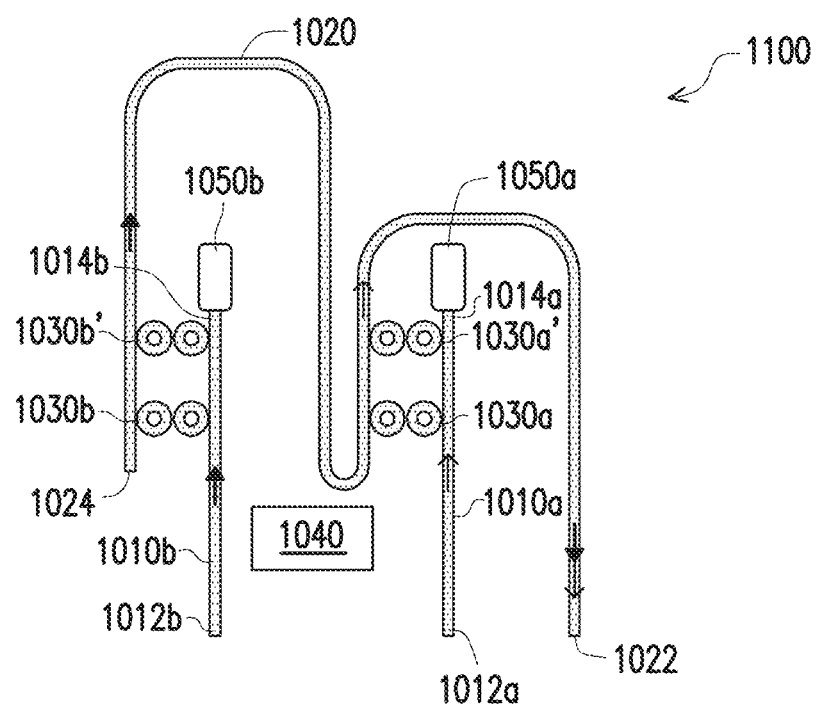
FIG. 11 is a schematic view of a photonic device in an IC in accordance with some embodiments.

FIG. 11 is a schematic view of a photonic device 1100 in an IC in accordance with some embodiments. The photonic device 1100 is similar to the photonic device 1000 (FIG. 10). In comparison with the photonic device 1000 (FIG. 10), the photonic device 1100 includes multiple resonant rings in each of the first resonant structure 1130*a*, the first redundant resonant structure 1130*a*', the second resonant structure 1130*b*, and the second redundant resonant structure 1130*b*'. In comparison with the photonic device 1000 (FIG. 10), the output waveguide 1020 is oriented in a different direction to account for the change in the direction of propagation of the optical signal as a result of the inclusion of the additional resonant rings. One of ordinary skill in the art would recognize that additional resonant rings are able to be included in the photonic device 1100 in some embodiments. While the photonic device 1100 includes two resonant structures at location, one of ordinary skill in the art would recognize that an arrangement with a different number of resonant structures at each location is possible. For example, in some embodiments, one resonant structure is at the first redundant resonant structure 1130*a*' and two resonant structures are at the second redundant resonant structure 1130*b*'.

Figure 12:
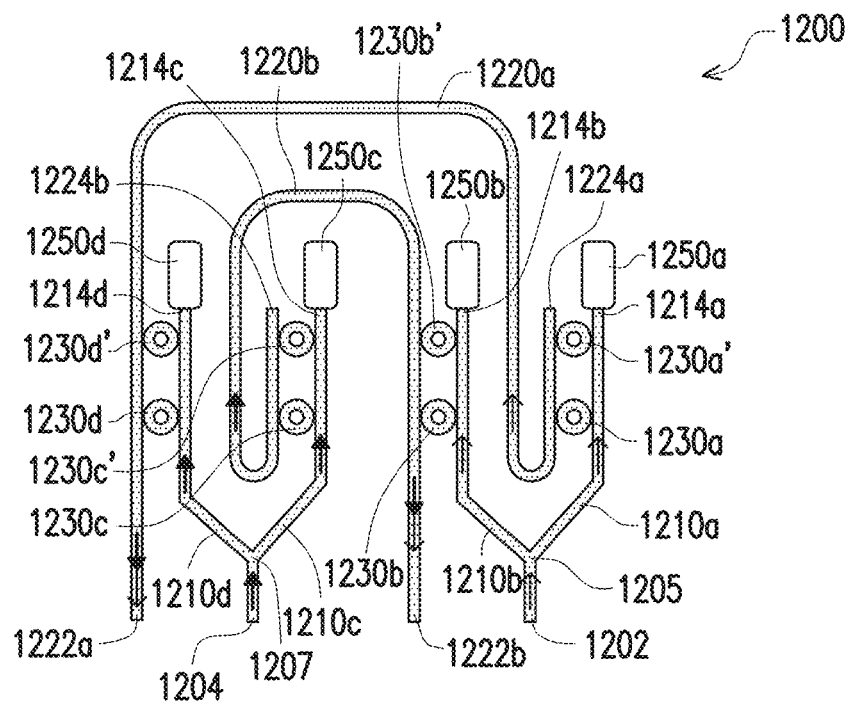
FIG. 12 is a schematic view of a photonic device in an IC in accordance with some embodiments.

FIG. 12 is a schematic view of a photonic device 1200 in an IC in accordance with some embodiments. The photonic device 1200 is similar to the photonic device 1000 (FIG. 10). In comparison with the photonic device 1000 (FIG. 10), the photonic device 1200 includes beam splitters 1205 and 1207 to separate input ports into two arms. As a result, the photonic device 1200 is able to function as a 2×2 MUX.

The photonic device 1200 includes a first input port 1202 configured to receive a first wavelength of light. The photonic device 1200 further includes a second input port 1204 configured to receive a second wavelength of light different from the first wavelength of light. The optical signal at the first input port 1202 is split by a first beam splitter 1205 to have the split optical signal propagate along a first arm 1210*a* and a second arm 1210*b*. The optical signal at the second input port 1204 is split by a second beam splitter 1207 to have the split optical signal propagate along a third arm 1210*c* and a fourth arm 1210*d*. The photonic device 1200 further includes a first output waveguide 1220*a* and a second output waveguide 1220*b* configured to output an optical signal including both the first wavelength of light and the second wavelength of light. A first resonant structure 1230*a* is configured to optically couple the first arm 1210*a* to the first output waveguide 1220*a*. A first redundant resonant structure 1230*a*' is configured to optically couple the first arm 1210*a* to the first output waveguide 1220*a*. A second resonant structure 1230*b* is configured to optically couple the second arm 1210*b* to the second output waveguide 1220*b*. A second redundant resonant structure 1230*b*' is configured to optically couple the second arm 1210*b* to the second output waveguide 1220*b*. A third resonant structure 1230*c* is configured to optically couple the third arm 1210*c* to the second output waveguide 1220*b*. A third redundant resonant structure 1230*c'* is configured to optically couple the third arm 1210*c* to the second output waveguide 1220*b*. A fourth resonant structure 1230*d* is configured to optically couple the fourth arm 1210*d* to the first output waveguide 1220*a*. A fourth redundant resonant structure 1230*d'* is configured to optically couple the fourth arm 1210*d* to the first output waveguide 1220*a*.

A first monitoring structure 1250*a* is configured to monitor an amount of light that remains in the first arm 1210*a* following coupling by the first resonant structure 1230*a* and the first redundant resonant structure 1230*a'*. A second monitoring structure 1250*b* is configured to monitor an amount of light that remains in the second arm 1210*b* following coupling by the second resonant structure 1230*b* and the second redundant resonant structure 1230*b'*. A third monitoring structure 1250*c* is configured to monitor an amount of light that remains in the third arm 1210*c* following coupling by the third resonant structure 1230*c* and the third redundant resonant structure 1230*c'*. A fourth monitoring structure 1250*d* is configured to monitor an amount of light that remains in the fourth arm 1210*d* following coupling by the fourth resonant structure 1230*d* and the fourth redundant resonant structure 1230*d'*.

A controller is not included in FIG. 12 for the sake of simplicity of the drawing. However, the photonic device 1200 includes a controller, similar to the controller 1040 (FIG. 10), for selectively coupling arms of the photonic device 1200 to corresponding output waveguides using respective redundant resonant structures.

Each of the first input port 1202 and the second input port 1204 is similar to the input port 112 (FIG. 1). The first arm 1210*a* includes a first through port 1214*a*. The second arm 1210*b* includes a second through port 1214*b*. The third arm 1210*c* includes a third through port 1214*c*. The fourth arm 1210*d* includes a fourth through port 1214*d*. Each of the first through port 1214*a*, the second through port 1214*b*, the third through port 1214*c* and the fourth through port 1214*d* is similar to the through port 114 (FIG. 1). One of ordinary skill in the art would recognize that PDs would be located an output of drop port 1222*a* and the drop port 1222*b*.

The first output waveguide 1220*a* includes a first drop port 1222*a* and a first add port 1224*a*. The second output waveguide 1220*b* includes a second drop port 1222*b* and a second add port 1224*b*. Each of the first drop port 1222*a* and the second drop port 1222*b* is similar to drop port 122 (FIG. 1). Each of the first add port 1224*a* and the second add port 1224*b* is similar to the add port 124 (FIG. 1).

Each of the first resonant structure 1230*a*, the first redundant resonant structure 1230*a'*, the second resonant structure 1230*b*, the second redundant resonant structure 1230*b'*, the third resonant structure 1230*c*, the third redundant resonant structure 1230*c'*, the fourth resonant structure 1230*d* and the fourth redundant resonant structure 1230*d'* is similar to the resonant structure 130 (FIG. 1). By including redundant resonant structures, such as the first redundant resonant structure 1230*a'*, the second redundant resonant structure 1230*b'*, the third redundant resonant structure 1230*c'* and the fourth redundant resonant structure 1230*d'*, the photonic device 1200 is able to continue to function even if one resonant structure fails.

While FIG. 12 does not include a control element for the sake of simplicity of the drawing, one of ordinary skill in the art would recognize that the photonic device 1200 includes at least one control element for controlling coupling through the first redundant resonant structure 1230*a'*, the second redundant resonant structure 1203*b'*, third redundant resonant structure 1230*c'* and the fourth redundant resonant structure 1230*d'*. In some embodiments, a single controller controls all control elements in the photonic device 1200. In some embodiments, control elements are controlled by a separate controllers.

The first monitoring structure 1250*a*, the second monitor structure 1250*b*, the third monitoring structure 1250*c* and the fourth monitoring structure 1250*d* are each similar to the first monitoring structure 1050*a*. Based on the outputs from the monitoring structures, the photonic device 1200 are usable by the controller in order to operate the photonic device 1200 in a manner similar to that described above with respect to the photonic device 1000 (FIG. 10).

Figure 13:
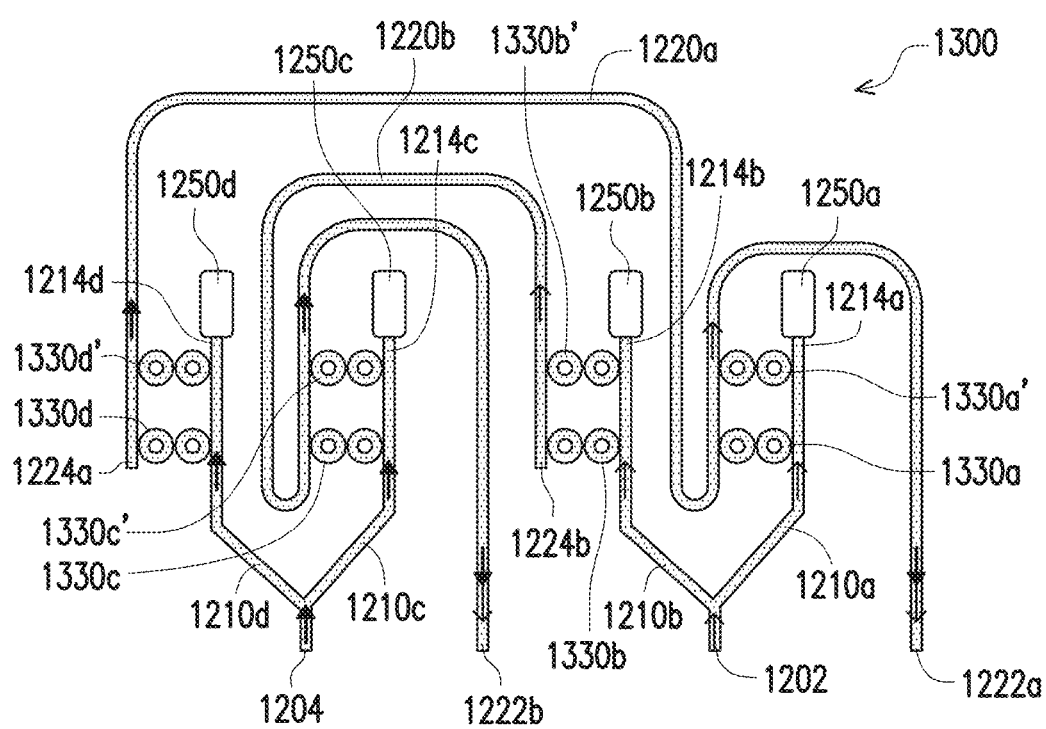
FIG. 13 is a schematic view of a photonic device in an IC in accordance with some embodiments.

FIG. 13 is a schematic view of a photonic device 1300 in an IC in accordance with some embodiments. The photonic device 1300 is similar to the photonic device 1200 (FIG. 12). In comparison with the photonic device 1200 (FIG. 12), the photonic device 1300 includes multiple resonant rings in each of the first resonant structure 1330*a*, the first redundant resonant structure 1330*a'*, the second resonant structure 1330*b*, the second redundant resonant structure 1330*b'*, the third resonant structure 1330*c*, the third redundant resonant structure 1330*c'*, the fourth resonant structure 1330*d*, and the fourth redundant resonant structure 1330*d'*. In comparison with the photonic device 1200 (FIG. 12), the first output waveguide 1220*a* and the second output waveguide 1220*b* are oriented in a different direction to account for the change in the direction of propagation of the optical signal as a result of the inclusion of the additional resonant rings. One of ordinary skill in the art would recognize that additional resonant rings are able to be included in the photonic device 1300 in some embodiments. While the photonic device 1300 includes two resonant structures at location, one of ordinary skill in the art would recognize that an arrangement with a different number of resonant structures at each location is possible. For example, in some embodiments, one resonant structure is at the first redundant resonant structure 1330*a'* and two resonant structures are at the second redundant resonant structure 1330*b'*.

Figure 14:
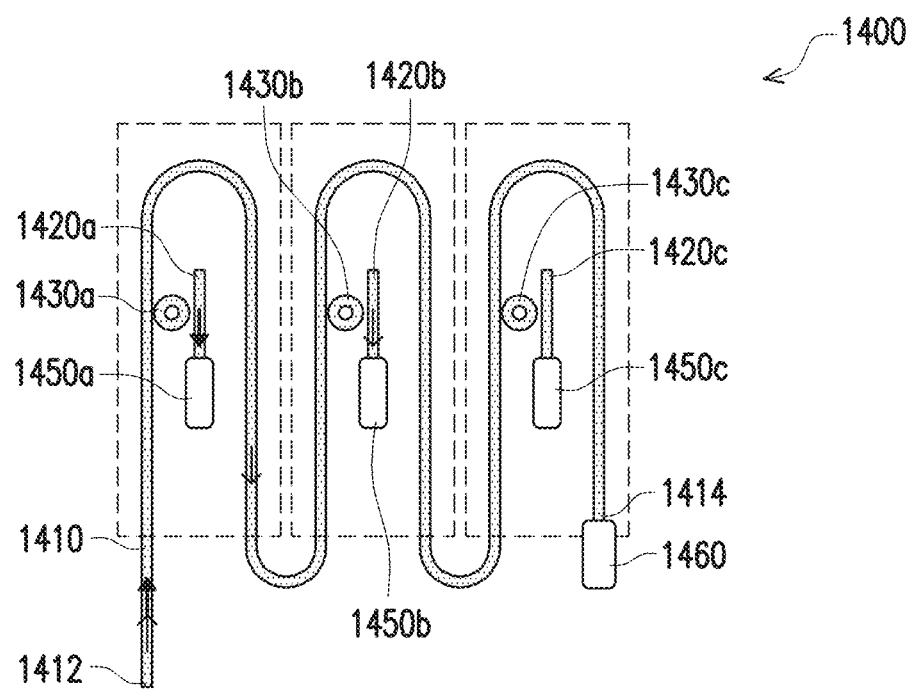
FIG. 14 is a schematic view of a photonic device in an IC in accordance with some embodiments.

FIG. 14 is a schematic view of a photonic device 1400 in an IC in accordance with some embodiments. The photonic device 1400 is capable of operating as a DeMUX. The photonic device 1400 includes an input waveguide 1410 having an input port 1412 and a through port 1414. The through port 1414 is in optical communication with a monitoring device 1460. A first output waveguide 1420*a* is configured to be optically coupled to the input waveguide 1410 by a first resonant structure 1430*a*. A second output waveguide 1420*b* is configured to be optically coupled to the input waveguide 1410 by a second resonant structure 1430*b*. A redundant output waveguide 1420*c* is configured to be optically coupled to the input waveguide 1410 by a redundant resonant structure 1430*c*. Although not labeled for the sake of clarity of the drawing, each of the first output waveguide 1420*a*, the second output waveguide 1420*b* and the redundant output waveguide 1420*c* includes an add port and a drop port. The drop port of the first output waveguide 1420*a* is optically coupled to a first PD 1450*a*. The drop port of the second output waveguide 1420*b* is optically coupled to a second PD 1450*b*. The drop port of the redundant waveguide 1420*c* is optically coupled to a redundant PD 1450*c*.

In order to function as a DeMUX, the photonic device 1400 is configured to receive multiple wavelengths of light in the input waveguide 1410. A first wavelength is coupled to the first output waveguide 1420*a* and output to the first PD 1450*a*. A second wavelength is coupled to the second output waveguide 1420*b* and output to the second PD 1450*b*. During operation, the redundant resonant structure 1430*c* is tunable to couple either the first wavelength or the second wavelength to the redundant output waveguide 1420*c* and output to the redundant PD 1450*c*. In some embodiments, a control structure, such as controller 140 and control element 142 (FIG. 1) are used to tune the redundant resonant structure 1430*c*. The control structure is not shown in the drawing for clarity of the drawing.

By including the redundant resonant structure 1430*c*, redundant output waveguide 1420*c* and redundant PD 1450*c*, the photonic device 1400 is able to continue operating as intended even if one of the structures associated with either the first output waveguide 1420*a* or the second output waveguide 1420*b* is damaged or becomes non-functional. In some embodiments, even when the structures associated with the first output waveguide 1420*a* and the second output waveguide 1420*b* are functioning properly, the redundant resonant structure 1430*c* is configured to couple the first wavelength or the second wavelength into the redundant output waveguide 1420*c* in order to maximize an amount of the optical signal captured by the PDs of the photonic device 1400. In this manner, any wavelength of the optical signal that is not coupled out of the input waveguide 1410 by the first resonant structure 1430*a* or the second resonant structure 1430*b* has a second opportunity to be coupled out of the input waveguide 1410 by the redundant resonant structure 1430*c*. While FIG. 14 includes two wavelengths one of ordinary skill in the art would recognize that additional wavelengths are contemplated by the photonic device 1400.

Each of the input waveguide 1410, the first output waveguide 1420*a*, the second output waveguide 1420*b*, and the redundant output waveguide 1420*c* is similar to the input waveguide 110 (FIG. 1). Each of the first resonant structure 1430*a*, the second resonant structure 1430*b* and the redundant resonant structure 1430*c* is similar to the resonant structure 130 (FIG. 1). Each of the first PD 1450*a*, the second PD 1450*b* and the redundant PD 1450*c* is similar to the first PD 150 (FIG. 1). The monitoring device 1460 is similar to the first monitoring structure 1250*a* (FIG. 12).

Figure 15:
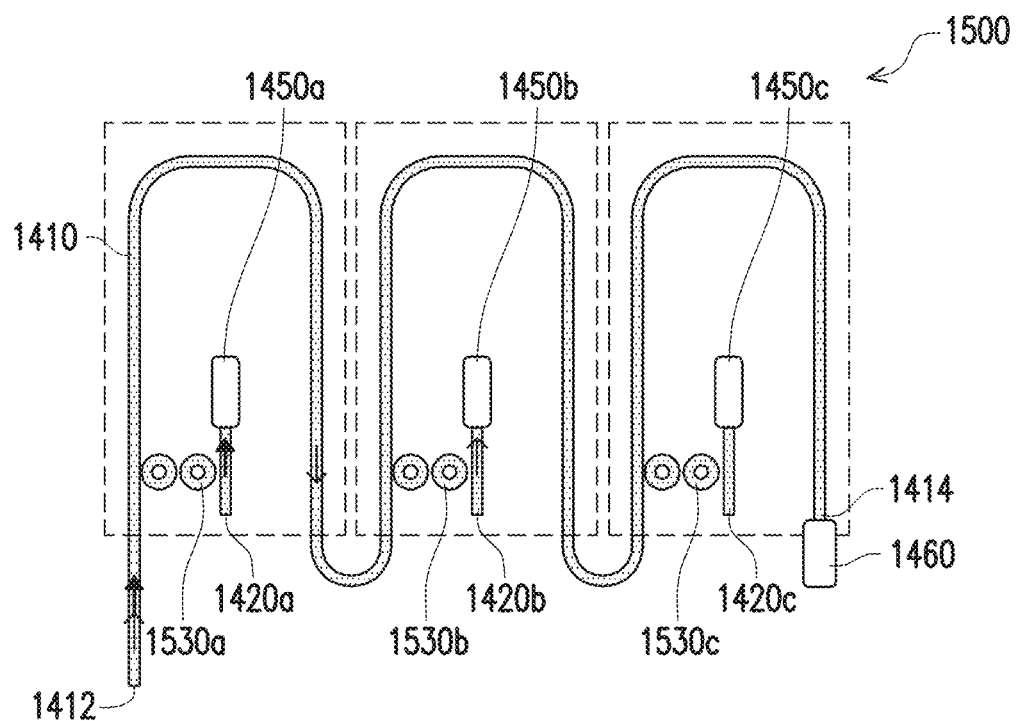
FIG. 15 is a schematic view of a photonic device in an IC in accordance with some embodiments.

FIG. 15 is a schematic view of a photonic device 1500 in an IC in accordance with some embodiments. The photonic device 1500 is similar to the photonic device 1400 (FIG. 14). In comparison with the photonic device 1400 (FIG. 14), the photonic device 1500 includes multiple resonant rings in each of the first resonant structure 1530*a*, the second resonant structure 1530*b*, and the redundant resonant structure 1530*c*. In comparison with the photonic device 1400 (FIG. 14), the first output waveguide 1520*a*, the second output waveguide 1520*b* and the redundant output waveguide 1520*c* are oriented in a different direction to account for the change in the direction of propagation of the optical signal as a result of the inclusion of the additional resonant rings. One of ordinary skill in the art would recognize that additional resonant rings are able to be included in the photonic device 1500 in some embodiments. While the photonic device 1500 includes two resonant structures at location, one of ordinary skill in the art would recognize that an arrangement with a different number of resonant structures at each location is possible. For example, in some embodiments, one resonant structure is at the first redundant resonant structure 1530*a*' and two resonant structures are at the second redundant resonant structure 1530*b*'.

Figure 16:
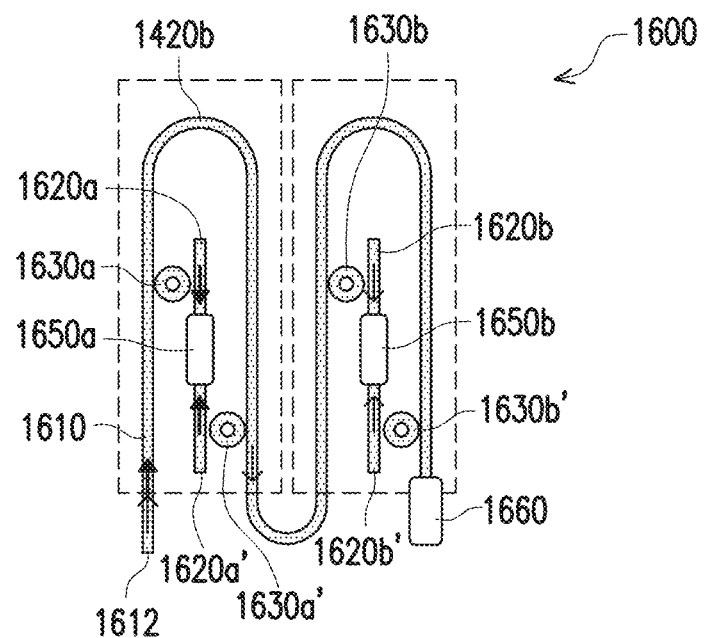
FIG. 16 is a schematic view of a photonic device in an IC in accordance with some embodiments.

FIG. 16 is a schematic view of a photonic device 1600 in an IC in accordance with some embodiments. The photonic device 1600 is capable of operating as a DeMUX. The photonic device 1600 includes an input waveguide 1610 having an input port 1612 and a through port 1614. The through port 1614 is in optical communication with a monitoring device 1660. A first output waveguide 1620*a* is configured to be optically coupled to the input waveguide 1610 by a first resonant structure 1630*a*. A first redundant output waveguide 1620*a*' is configured to be optically coupled to the input waveguide 1610 by a first redundant resonant structure 1630*a*'. A second output waveguide 1620*b* is configured to be optically coupled to the input waveguide 1610 by a second resonant structure 1630*b*. A second redundant output waveguide 1620*b*' is configured to be optically coupled to the input waveguide 1610 by a second redundant resonant structure 1630*b*'. Although not labeled for the sake of clarity of the drawing, each of the first output waveguide 1620*a*, the first redundant output waveguide 1620*a*', the second output waveguide 1620*b* and the second redundant output waveguide 1620*b*' includes an add port and a drop port. The drop port of the first output waveguide 1620*a* and the first redundant output waveguide 1620*a* are both optically coupled to a first PD 1650*a*. The drop port of the second output waveguide 1620*b* and the second redundant output waveguide 1620*b*' are both optically coupled to a second PD 1650*b*.

In order to function as a DeMUX, the photonic device 1600 is configured to receive multiple wavelengths of light in the input waveguide 1610. A first wavelength is coupled to the first output waveguide 1620*a* and output to the first PD 1650*a*. A second waveguide is coupled to the second output waveguide 1620*b* and output to the second PD 1650*b*. During operation, the first redundant resonant structure 1630*a*' is tunable to couple the first wavelength to the first redundant output waveguide 1620*a*' and output to the first PD 1650*a*. During operation, the second redundant resonant structure 1630*b*' is tunable to couple the second wavelength to the second redundant output waveguide 1620*b*' and output to the second PD 1650*b*. In some embodiments, a control structure, such as controller 140 and control element 142 (FIG. 1) are used to tune at least one of the first redundant resonant structure 1630*a*' or the second redundant resonant structure 1630*b*'. The control structure is not shown in the drawing for clarity of the drawing.

By including the first redundant resonant structure 1620*a*' and the second redundant resonant structure 1620*b*', the photonic device 1600 is able to continue operating as intended even if one of the structures associated with either the first output waveguide 1620*a* or the second output waveguide 1620*b* is damaged or becomes non-functional. In some embodiments, even when the structures associated with the first output waveguide 1620*a* and the second output waveguide 1620*b* are functioning properly, at least one of the first redundant resonant structure 1630*a*' or the second redundant resonant structure 1630*b*' is configured to couple the first wavelength or the second wavelength into the corresponding redundant output waveguide 1620*a*' or 1620*b*' in order to maximize an amount of the optical signal captured by the PDs of the photonic device 1600. In this manner, any wavelength of the optical signal that is not coupled out of the input waveguide 1610 by the first resonant structure 1630*a* or the second resonant structure 1630*b* has a second opportunity to be coupled out of the input waveguide 1610 to improve overall coupling efficiency. While FIG. 16 includes two wavelengths one of ordinary skill in the art would recognize that additional wavelengths are contemplated by the photonic device 1600.

Each of the input waveguide 1610, the first output waveguide 1620*a*, the first redundant output waveguide 1620*a*', the second output waveguide 1620*b*, and the second redundant output waveguide 1620*b*' is similar to the input waveguide 110 (FIG. 1). Each of the first resonant structure 1630*a*, the first redundant resonant structure 1630*a*', the second resonant structure 1630*b* and the second redundant resonant structure 1630*b*' is similar to the resonant structure 130 (FIG. 1). Each of the first PD 1650*a* and the second PD 1650*b* is similar to the first PD 150 (FIG. 1). The monitoring device 1660 is similar to the first monitoring structure 1250*a* (FIG. 12).

Figure 17:
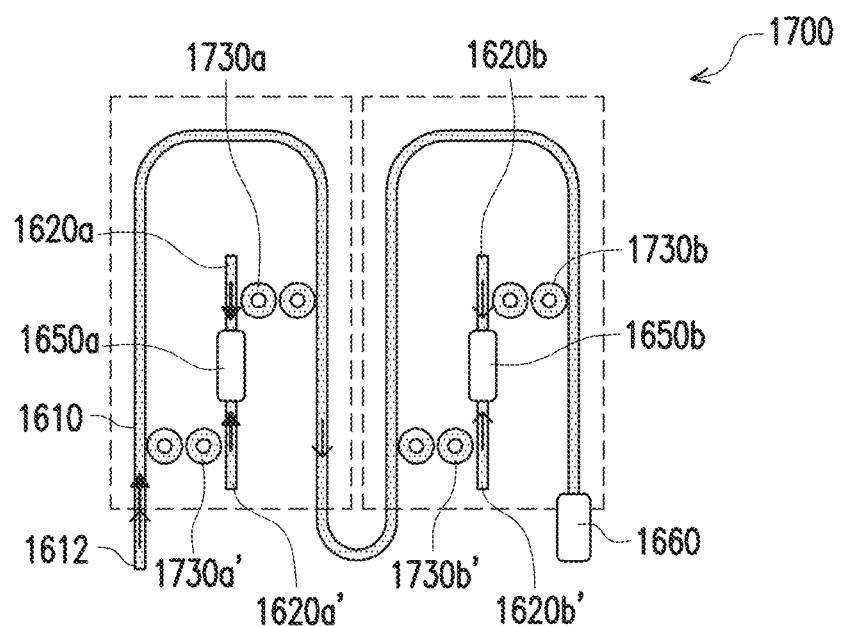
FIG. 17 is a schematic view of a photonic device in an IC in accordance with some embodiments.

FIG. 17 is a schematic view of a photonic device 1700 in an IC in accordance with some embodiments. The photonic device 1700 is similar to the photonic device 1600 (FIG. 16). In comparison with the photonic device 1600 (FIG. 16), the photonic device 1700 includes multiple resonant rings in each of the first resonant structure 1730*a*, the first redundant resonant structure 1730*a*', the second resonant structure 1730*b*, and the second redundant resonant structure 1730*b*'. In comparison with the photonic device 1600 (FIG. 16), the first resonant structure 1730*a*, the first redundant resonant structure 1730*a*', the second resonant structure 1730*b* and the second redundant resonant structure 1730*b*' are oriented in a different direction to account for the change in the direction of propagation of the optical signal as a result of the inclusion of the additional resonant rings. One of ordinary skill in the art would recognize that additional resonant rings are able to be included in the photonic device 1700 in some embodiments. While the photonic device 1700 includes two resonant structures at location, one of ordinary skill in the art would recognize that an arrangement with a different number of resonant structures at each location is possible. For example, in some embodiments, one resonant structure is at the first redundant resonant structure 1730*a*' and two resonant structures are at the second redundant resonant structure 1730*b*'.

Figure 18:
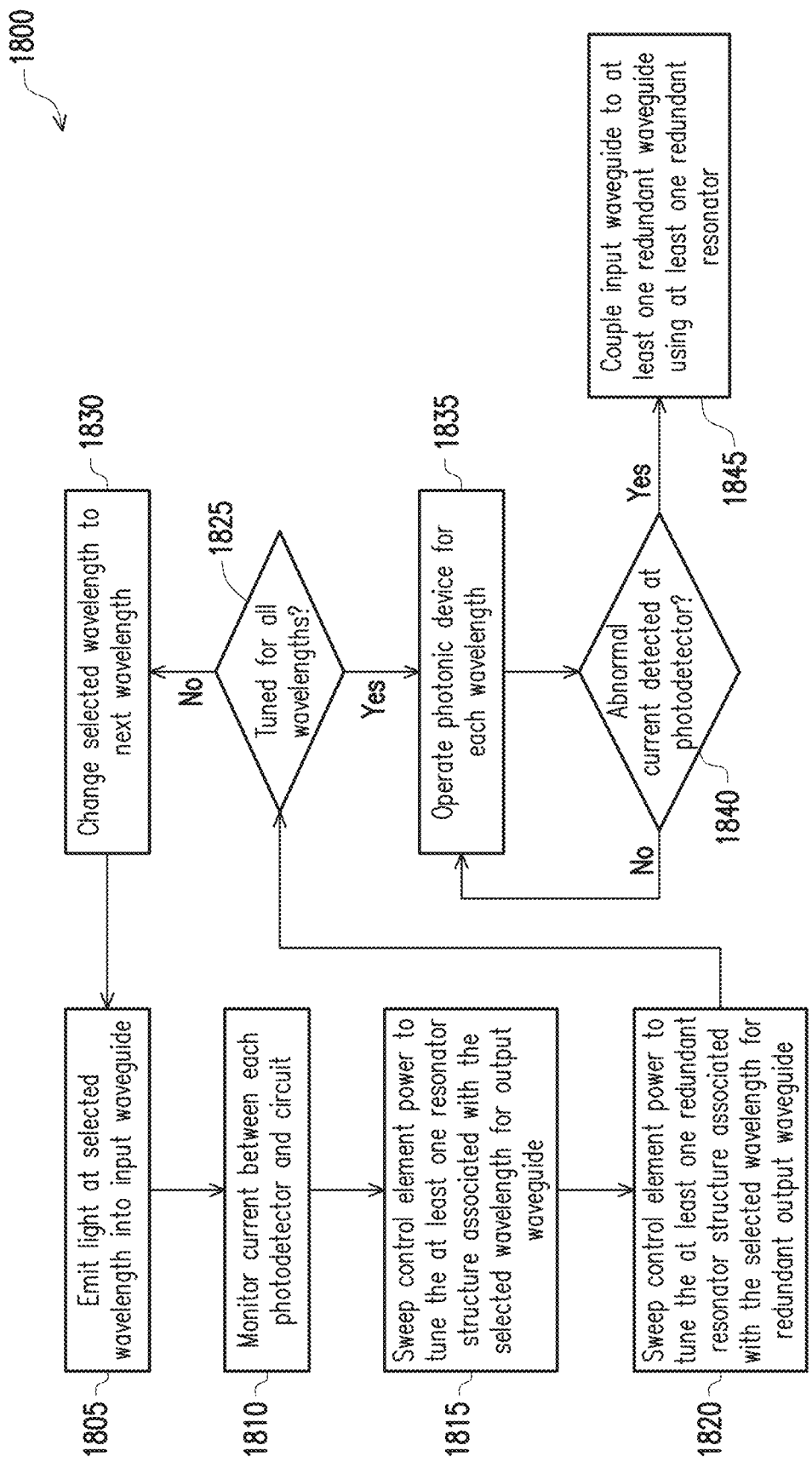
FIG. 18 is a flow chart of a method of using a photonic device in an IC in accordance with some embodiments.

FIG. 18 is a flow chart of a method 1800 of using a photonic device in an IC in accordance with some embodiments. The method 1800 is usable to tune and operate the photonic device 1400 (FIG. 14), the photonic device 1500 (FIG. 15), the photonic device 1600 (FIG. 16), the photonic device 1700 (FIG. 17) or other photonic devices including redundant waveguides.

In operation 1805, light of a selected wavelength is emitted into the input waveguide, e.g., the input waveguide 1410 (FIG. 14). In some embodiments, the light is emitted from a component of the IC including the photonic device. In some embodiments, the light is emitted from an external device.

In operation 1810, a current between each PD of the photonic device and the electronic circuit is monitored. In some embodiments, the current is monitored using an ammeter. In some embodiments, the current information is provided to a controller, e.g., the controller 140 (FIG. 1), of the photonic device. In some embodiments, the operation 1810 is performed continuously throughout the method 1800 in order to provide feedback on a status of the photonic device.

In operation 1815, the input waveguide is coupled to an output waveguide by sweeping control signals for at least one resonant structure. In some embodiments, the controller, e.g., the controller 140 (FIG. 1), drives at least one control element, e.g., the control element 142 (FIG. 1), in order to couple the input waveguide to the at least one output waveguide. In some embodiments, the control element is a thermal control element. In some embodiments, the control element is a voltage control element. In some embodiment, the input waveguide is passively coupled to the at least one output waveguide through the at least one resonator structure.

In operation 1820, the control element is swept across a range of values to tune the at least one redundant resonator structure. The current between each of the PDs and the electronic circuit is measured during operation 1820 in order to determine the path the optical signal is taking for each of the values for the control element. In some embodiments, the controller, e.g., the controller 140 (FIG. 1), electrically controls the control element, e.g., the control element 142 (FIG. 1), in order to set the control element at a variety of different values. In some embodiments, the controller drives the control element to change a temperature of the at least one redundant resonant structure. In some embodiments, the controller drives the control element to change an electrical field applied to the at least one redundant resonant structure. In some embodiments that include multiple resonator structures, multiple control elements are swept in order to determine the path of the optical signal for different combinations of values for the control elements.

Once control settings that product peak currents for each PD, are identified, the control settings for the resonant structure and the redundant resonant structure are stored. In some embodiments, the time at which the control settings are stored are also stored in the memory. In some embodiments, after a predetermined lapse in time, operations 1805-1820 are repeated in order to account for any changes in the performance of the photonic device due to oxidation or moisture penetration for example. Updating the control settings to account for variations in the photonic device helps to ensure that the photonic device continues to operate at maximum performance during the useful life of the photonic device.

In operation 1825, a determination is made regarding whether tuning for all wavelengths which the photonic device is designed to receive has been performed. In response to a determination that tuning has occurred for less than all of the wavelengths, the method 1800 proceeds to operation 1830. In response to a determination that tuning has occurred for all wavelengths, the method 1800 proceeds to operation 1835.

In operation 1830, a next wavelength of the designed wavelengths for the photonic device is selected and the method 1800 returns to operation 1805.

In operation 1835, the photonic device is operated using an initial setting. The input waveguide receives multiple wavelengths of light and each of the wavelengths to be separated are separately coupled to a corresponding output waveguide. In some embodiments, at least one control element is utilized to maintain at least one resonant structure in a coupling mode during the initial settings. In some embodiments, coupling between the input waveguide and the output waveguides is all through passive coupling. In some embodiments, redundant resonant structures are controlled to be in a coupling state. In some embodiments, at least one redundant resonant structure is not controlled to be in a coupling state.

In operation 1840, a determination is made regarding whether an abnormal current is detected at any of the PDs of the photonic device. The abnormal current indicates that communication of the corresponding wavelength of light to the electronic circuit includes a flaw. The abnormal current is identified in response to the current between the PD, e.g., the first PD 1450*a* (FIG. 14), and the electronic circuit being different from an expected value. The expected value is based on an intensity of the light emitted to be received by the input port of the input waveguide. In some embodiments, current values obtained during a latest iteration of operation 1820 are used as the expected value. In some embodiments, a tolerance threshold is applied to the expected value in order to help account for minor variations and imperfections in the photonic device. For example, if any of the resonant structures is damaged and light is leaked or fails to couple from the input waveguide less of the corresponding wavelength of light will reach the PD. As a result, the current between the PD and the electronic circuit will be lower than expected. In another example, if current is leaking into the electronic circuit from another PD, the current between the PD and the electronic circuit will be higher than expected. In both situations, the electrical signal received by the electronic circuit is not an accurate representation of the information to be used by the electronic circuit. In some embodiments, this determination is made by the controller, e.g., the controller 140 (FIG. 1).

In response to a determination that no abnormal current is detected, the method 1800 returns to operation 1835 and continues to operate as normal.

In response to a determination that an abnormal current is detected, the method 1800 proceeds to operation 1845, in which the input waveguide is coupled to the at least one redundant waveguide using at least one redundant resonant structure. Using the control setting determined in operations 1815 and 1820, the photonic device is able to precisely and accurately couple the optical signal into the at least one redundant waveguide, e.g., the redundant waveguide 1420*c* (FIG. 14). Once the optical signal is coupled to the at least one redundant waveguide, the electronic circuit, e.g., the electronic circuit 160 (FIG. 1), will begin receiving an electrical signal from the PD(s), e.g., the redundant PD 1450*c* (FIG. 14), optically connected to the at least one redundant waveguide.

One of ordinary skill in the art would recognize that the method 1800 is usable to operate numerous photonic devices including the photonic device 1400 (FIG. 14), the photonic device 1500 (FIG. 15), the photonic device 1600 (FIG. 16), the photonic device 1700 (FIG. 17), as well as other photonic devices including some photonic devices described below. In some embodiments, an order of operations in the method 1800 is altered. For example, in some embodiments, operation 1810 is performed after operation 1815. In some embodiments, additional operations are included in the method 1800. For example, in some embodiments, operations 1805-1820 are repeated periodically to account for drift in the photonic device. In some embodiments, at least one operation of the method 1800 is omitted. For example, in some embodiments, the operation 1815 is omitted or combined with operation 1820.

While the description of the method 1800 is described for operation of DeMUX, one of ordinary skill in the art would understand how to modify the method 1800 to be applicable to a MUX structure for example in the photonic device 1000 (FIG. 10), the photonic device 1100 (FIG. 11), the photonic device 1200 (FIG. 12), the photonic device 1300 (FIG. 13) or another photonic device.

Figure 19:
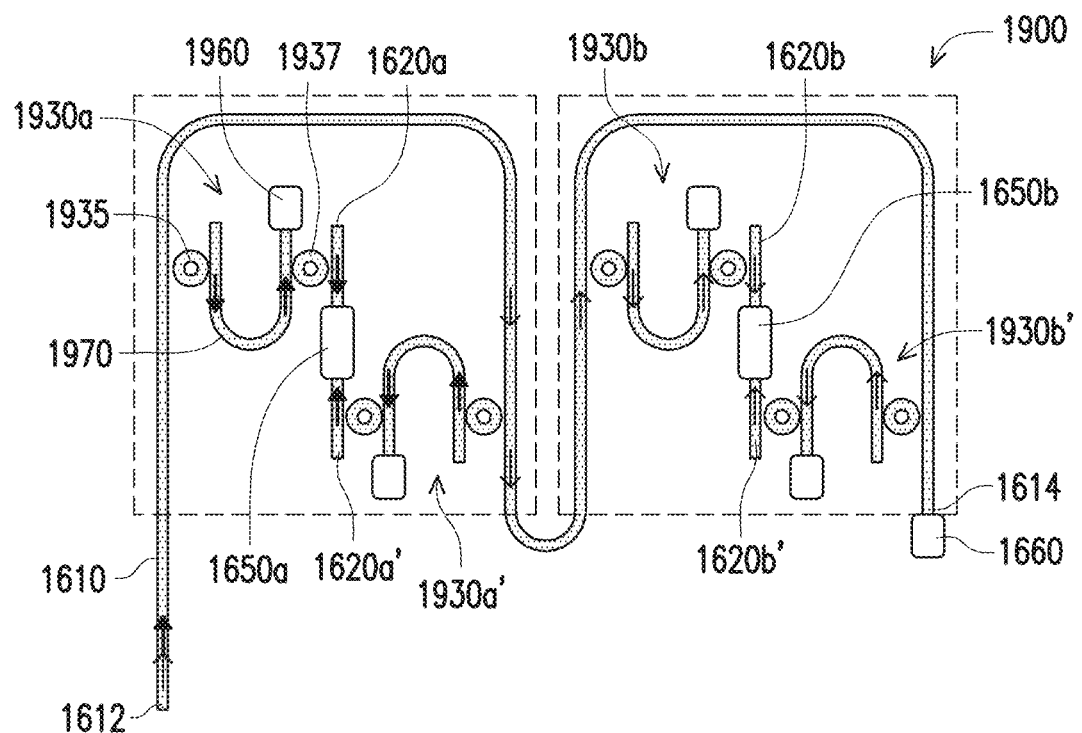
FIG. 19 is a schematic view of a photonic device in an IC in accordance with some embodiments.

FIG. 19 is a schematic view of a photonic device 1900 in an IC in accordance with some embodiments. The photonic device 1900 is similar to the photonic device 1600 (FIG. 16). In comparison with the photonic device 1600 (FIG. 16), the photonic device 1900 includes two stage resonant structures. A first two-stage resonant structure 1930*a* is configured to optically couple the input waveguide 1610 to the first output waveguide 1620*a*. A first redundant two stage resonant structure 1930*a*' is configured to optically couple the input waveguide 1610 to the first redundant output waveguide 1620*a*'. A second two-stage resonant structure 1930*b* is configured to optically couple the input waveguide 1610 to the second output waveguide 1620*b*. A second redundant two stage resonant structure 1930*b*' is configured to optically couple the input waveguide 1610 to the second redundant output waveguide 1620*b*'. Each of the two stage resonant structures have a similar arrangement. For the sake of brevity, only the first two stage resonant structure 1930*a* is discussed in detail.

The first two stage resonant structure 1930*a* is configured to implement a similar function as resonant structure 1630*a* (FIG. 16). In comparison, by including the two stage resonant structure, crosstalk is reduced. That is, light other than the first wavelength is less likely to reach first output waveguide 1620*a* using the first two stage resonant structure 1930*a* than if the first resonant structure 1630*a* (FIG. 16) is used. However, a size of the first two stage resonant structure 1930*a* is greater than the first resonant structure 1630*a* (FIG. 16).

The first two stage resonant structure 1930*a* includes a first resonant ring 1935 configured to optically couple the first wavelength from the input waveguide 1610 to an intermediate waveguide 1970. A second resonant ring 1937 is configured to couple the first wavelength from the intermediate waveguide 1970 to the first output waveguide 1620*a*. A monitoring structure 1960 is optically coupled to the drop port of the intermediate waveguide 1970. By including multiple couplings between the input waveguide 1610 and the first output waveguide 1620*a*, the risk of light having a wavelength other than the first wavelength reaching the first output waveguide 1620*a* is reduced in comparison with other resonant structures.

The intermediate waveguide 1970 is similar to the input waveguide 1610. Each of the first resonant ring 1935 and the second resonant ring 1937 is similar to the first resonant structure 1630*a* (FIG. 16). The monitoring device 1960 is similar to the monitoring device 1660.

While the photonic device 1900 includes a two stage resonant structure at each coupling location, one of ordinary skill in the art would recognize that a combination of two stage resonant structures and single stage resonant structures is possible. For example, in some embodiments, the photonic device includes the first two stage resonant structure 1930*a* and the first redundant resonant structure 1630*a*' (FIG. 16) for coupling the first wavelength between the input waveguide 1610 and the first PD 1650*a*. By replacing the first redundant two stage resonant structure 1930*a*' with the first redundant resonant structure 1630*a*', an overall size of the photonic device 1900 is reduced but a risk of cross talk increases when the redundant component is used.

Figure 20:
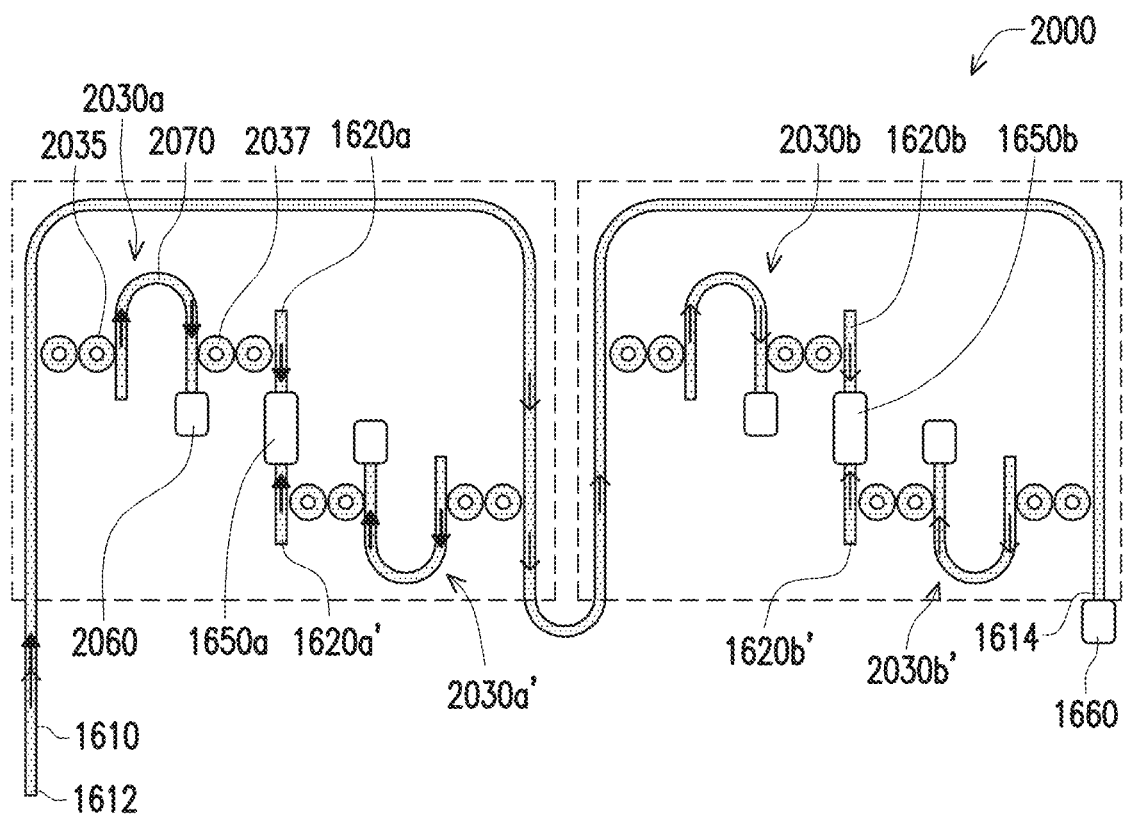
FIG. 20 is a schematic view of a photonic device in an IC in accordance with some embodiments.

FIG. 20 is a schematic view of a photonic device 2000 in an IC in accordance with some embodiments. The photonic device 2000 is similar to the photonic device 1900 (FIG. 19). In comparison with the photonic device 1900 (FIG. 19), the photonic device 2000 includes multiple resonant rings for each coupling of the first two stage resonant structure 2030*a*, the first redundant two stage resonant structure 2030*a*', the second two stage resonant structure 2030*b*, and the second redundant two stage resonant structure 2030*b*'. In comparison with the photonic device 1900 (FIG. 19), the first two stage resonant structure 2030*a*, the first redundant two stage resonant structure 2030*a*', the second two stage resonant structure 2030*b* and the second redundant two stage resonant structure 2030*b*' are oriented in a different direction to account for the change in the direction of propagation of the optical signal as a result of the inclusion of the additional resonant rings. One of ordinary skill in the art would recognize that additional resonant rings are able to be included in the photonic device 2000 in some embodiments. While the photonic device 2000 includes two resonant structures at location, one of ordinary skill in the art would recognize that an arrangement with a different number of resonant structures at each location is possible. Each of the two stage resonant structures have a similar arrangement. For the sake of brevity, only the first two stage resonant structure 2030a is discussed in detail.

The first two stage resonant structure 2030a includes a first resonant ring 2035 configured to optically couple the first wavelength from the input waveguide 1610 to an intermediate waveguide 2070. A second resonant ring 2037 is configured to couple the first wavelength from the intermediate waveguide 2070 to the first output waveguide 1620a. A monitoring structure 2060 is optically coupled to the drop port of the intermediate waveguide 2070. By including multiple couplings between the input waveguide 1610 and the first output waveguide 1620a, the risk of light having a wavelength other than the first wavelength reaching the first output waveguide 1620a is reduced in comparison with other resonant structures.

The intermediate waveguide 2070 is similar to the input waveguide 1610. Each of the first resonant ring 2035 and the second resonant ring 2037 is similar to the first resonant structure 1730a (FIG. 17). The monitoring device 2060 is similar to the monitoring device 1660.

Figure 21:
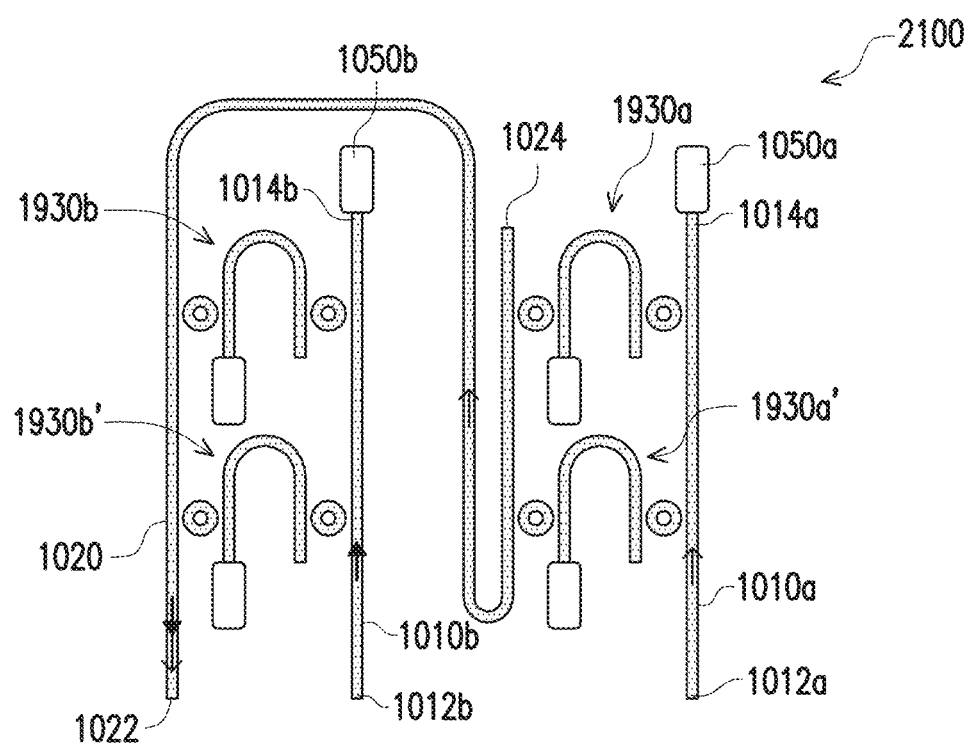
FIG. 21 is a schematic view of a photonic device in an IC in accordance with some embodiments.

FIG. 21 is a schematic view of a photonic device 2100 in an IC in accordance with some embodiments. The photonic device 2100 is similar to the photonic device 1000 (FIG. 10). In comparison with the photonic device 1000 (FIG. 10), the photonic device 2100 includes two stage resonant structures. A first two-stage resonant structure 1930a is configured to optically couple the first input waveguide 1010a to the output waveguide 1020. A first redundant two stage resonant structure 1930a' is configured to optically couple the first input waveguide 1010a to the output waveguide 1020. A second two-stage resonant structure 1930b is configured to optically couple the second input waveguide 1010b to the output waveguide 1020. A second redundant two stage resonant structure 1930b' is configured to optically couple the second input waveguide 1010b to the output waveguide 1020.

While the photonic device 2100 includes a two stage resonant structure at each coupling location, one of ordinary skill in the art would recognize that a combination of two stage resonant structures and single stage resonant structures is possible. For example, in some embodiments, the photonic device includes the first two stage resonant structure 1930a and the first redundant resonant structure 1030a' (FIG. 10) for coupling the first wavelength between the first input waveguide 1010a and the output waveguide 1020. By replacing the first redundant two stage resonant structure 1930a' with the first redundant resonant structure 1030a', an overall size of the photonic device 2100 is reduced but a risk of cross talk increases when the redundant component is used.

Figure 22:
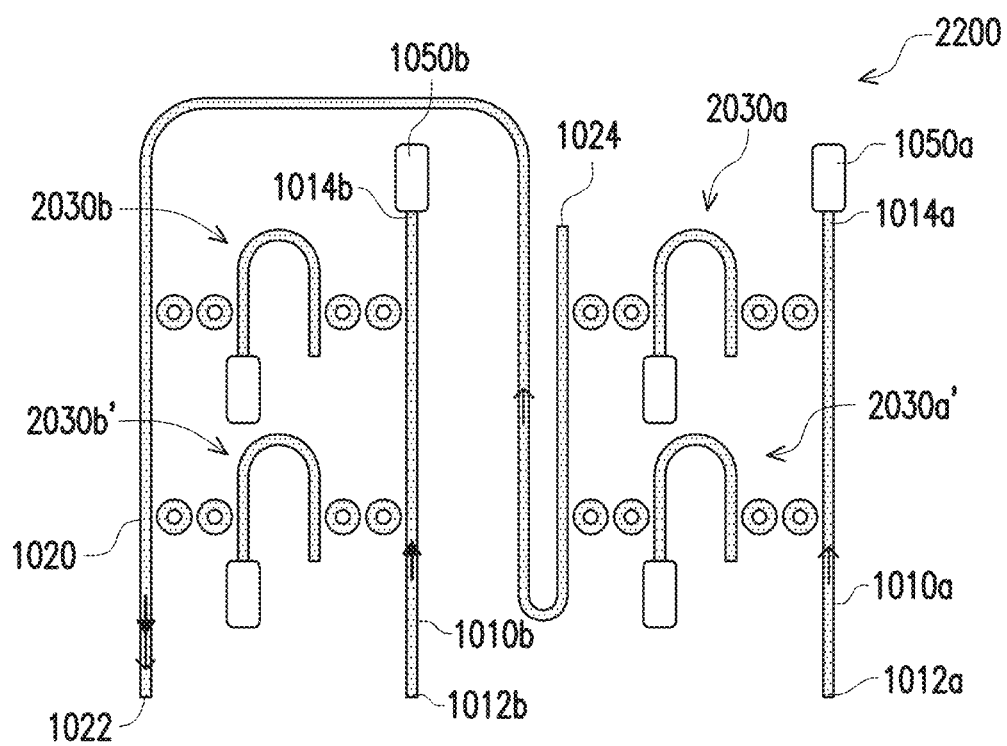
FIG. 22 is a schematic view of a photonic device in an IC in accordance with some embodiments.

FIG. 22 is a schematic view of a photonic device 2200 in an IC in accordance with some embodiments. The photonic device 2200 is similar to the photonic device 2100 (FIG. 21). In comparison with the photonic device 2100 (FIG. 21), the photonic device 2200 includes multiple resonant rings for each coupling of the first two stage resonant structure 2030a, the first redundant two stage resonant structure 2030a', the second two stage resonant structure 2030b, and the second redundant two stage resonant structure 2030b'. One of ordinary skill in the art would recognize that additional resonant rings are able to be included in the photonic device 2200 in some embodiments. While the photonic device 2200 includes two resonant structures at location, one of ordinary skill in the art would recognize that an arrangement with a different number of resonant structures at each location is possible.

Figure 23:
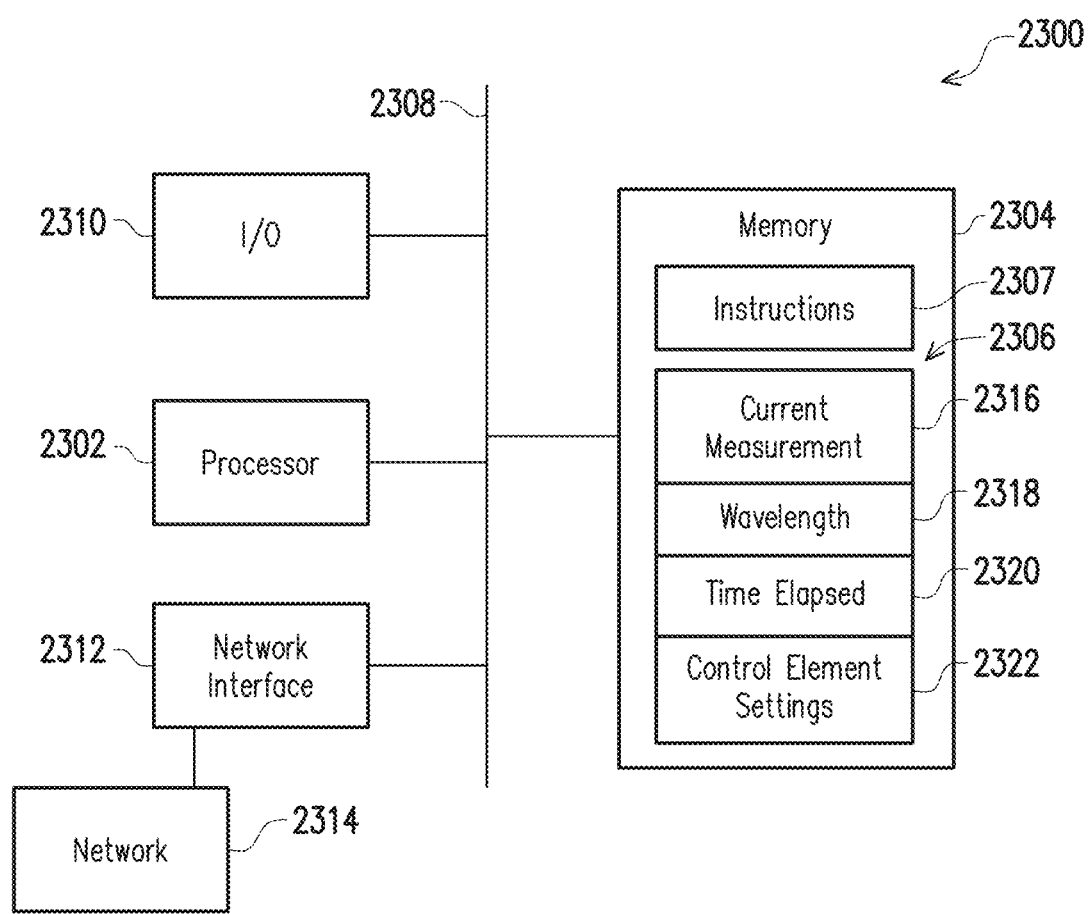
FIG. 23 is a block diagram of a controller for use with a photonic device in accordance with some embodiments.

FIG. 23 is a block diagram of a controller 2300 for use with a photonic device in accordance with some embodiments. Controller 2300 includes a hardware processor 2302 and a non-transitory, computer readable storage medium 2304 encoded with, i.e., storing, the computer program code 2306, i.e., a set of executable instructions. Computer readable storage medium 2304 is also encoded with instructions 2307 for interfacing with control elements, e.g., control element 142 (FIG. 1). The processor 2302 is electrically coupled to the computer readable storage medium 2304 via a bus 2308. The processor 2302 is also electrically coupled to an I/O interface 23010 by bus 2308. A network interface 2312 is also electrically connected to the processor 2302 via bus 2308. Network interface 2312 is connected to a network 2314, so that processor 2302 and computer readable storage medium 2304 are capable of connecting to external elements via network 2314. The processor 2302 is configured to execute the computer program code 2306 encoded in the computer readable storage medium 2304 in order to cause controller 2300 to be usable for performing a portion or all of the operations as described in method 500, method 1800 or any of the functionalities described above with respect to the photonic devices.

In some embodiments, the processor 2302 is a central processing unit (CPU), a multi-processor, a distributed processing system, an application specific integrated circuit (ASIC), and/or a suitable processing unit.

In some embodiments, the computer readable storage medium 2304 is an electronic, magnetic, optical, electromagnetic, infrared, and/or a semiconductor system (or apparatus or device). For example, the computer readable storage medium 2304 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 2304 includes a compact disk-read only memory (CD-ROM), a compact disk-read/write (CD-R/W), and/or a digital video disc (DVD).

In some embodiments, the storage medium 2304 stores the computer program code 2306 configured to cause controller 2300 to perform method 500, method 1800 or any of the functionalities described above with respect to the photonic devices. In some embodiments, the storage medium 2304 also stores information needed for performing a method 500, method 1800 or any of the functionalities described above with respect to the photonic devices as well as information generated during performing the method 500, method 1800 or any of the functionalities described above with respect to the photonic devices, such as a current measurement parameter 2316, a wavelength parameter 2318, a time elapsed parameter 2320, a control element settings parameter 2322 and/or a set of executable instructions to perform the operation of method 500, method 1800 or any of the functionalities described above with respect to the photonic devices. The current measurement parameter 2316 relates to currents measured between PDs and an electronic circuit. The wavelength parameter 2318 relates to a wavelength of light to be coupled. In some embodiments, the wavelength parameter 2318 relates to multiple wavelengths of light. The time elapsed parameter 2320 relates to an amount of time elapsed since a previous tuning of control elements in a photonic device. The control element setting parameter 2322 relates to a voltage to be applied to each of the control elements to selectively initiate coupling within the photonic device.

In some embodiments, the storage medium 2304 stores instructions 2307 for interfacing with control elements. The instructions 2307 enable processor 2302 to generate signals readable by the control elements to effectively implement method 500, method 1800 or any of the functionalities described above with respect to the photonic devices.

Controller 2300 includes I/O interface 2310. I/O interface 2310 is coupled to external circuitry. In some embodiments, I/O interface 2310 includes a keyboard, keypad, mouse, trackball, trackpad, and/or cursor direction keys for communicating information and commands to processor 2302.

Controller 2300 also includes network interface 2312 coupled to the processor 2302. Network interface 2312 allows controller 2300 to communicate with network 2314, to which one or more other computer systems are connected. Network interface 2314 includes wireless network interfaces such as BLUETOOTH, WIFI, WIMAX, GPRS, or WCDMA; or wired network interface such as ETHERNET, USB, or IEEE-1394. In some embodiments, method 500, method 1800 or any of the functionalities described above with respect to the photonic devices are implemented in two or more controllers 2300, and information such as current measurements, wavelengths, time elapsed and control element settings are exchanged between different controllers 2300 via network 2314.

An aspect of this description relates to an integrated circuit. The integrated circuit includes an electronic circuit. The integrated circuit further includes a photonic device. The photonic device includes a first photodetector (PD) electrically connected to the electronic circuit. The photonic device further includes a second PD electrically connected to the electronic circuit. The photonic device further includes a first waveguide configured to receive an optical signal input, wherein the first waveguide is optically connected to the first PD. The photonic device further includes a second waveguide optically connected to the second PD. The photonic device further includes a resonant structure between the first waveguide and the second waveguide, wherein the resonant structure is configured to optically couple the first waveguide to the second waveguide. In some embodiments, the photonic device further includes a controller, wherein the controller is configured to tune the resonant structure for selectively optically coupling the first waveguide to the second waveguide. In some embodiments, the controller is configured to tune the resonant structure by applying an electrical field to the resonant structure. In some embodiments, the controller is configured to tune the resonant structure by controlling a control element for heating the resonant structure. In some embodiments, the controller is configured to tune the resonant structure based on a measured current between the first PD and the electronic circuit. In some embodiments, the resonant structure includes multiple resonant rings. In some embodiments, the resonant structure includes a single resonant ring. In some embodiments, the resonant structure includes a two stage resonant structure. In some embodiments, the photonic device includes a multiplexer. In some embodiments, the photonic device includes a de-multiplexer. In some embodiments, the photonic device includes a Mach Zehnder Interferometer (MZI). In some embodiments, the photonic device further includes a third PD electrically connected to the electronic circuit; a third waveguide optically connected to the third PD; and a second resonant structure between the first waveguide and the third waveguide, wherein the second resonant structure is configured to optically couple the first waveguide to the third waveguide. In some embodiments, the resonant structure has a same structure as the second resonant structure. In some embodiments, the resonant structure has a different structure from the second resonant structure.

An aspect of this description relates to an integrated circuit. The integrated circuit includes an electronic circuit. The integrated circuit further includes a photonic device. The photonic device includes a first photodetector (PD) electrically connected to the electronic circuit. The photonic device further includes a second PD electrically connected to the electronic circuit. The photonic device further includes a first waveguide configured to receive an optical signal input, wherein the first waveguide is optically connected to the first PD. The photonic device further includes a second waveguide optically connected to the second PD. The photonic device further includes a first resonant structure between the first waveguide and the second waveguide, wherein the first resonant structure is configured to optically couple the first waveguide to the second waveguide. The photonic device further includes a second resonant structure between the first waveguide and the second waveguide, wherein the second resonant structure is configured to optically couple the first waveguide to the second waveguide. In some embodiments, the integrated circuit further includes a controller, wherein the controller is configured to tune the second resonant structure to selectively optically couple the first waveguide to the second waveguide. In some embodiments, the controller is configured to tune the second resonant structure based on a current between the first PD and the electronic circuit. In some embodiments, the second resonant structure is configured to optically couple the first waveguide to the second waveguide during an entire period of operation of the photonic device. In some embodiments, the photonic device includes a multiplexer or a de-multiplexer.

An aspect of this description relates to a method of using an integrated circuit. The method includes monitoring a current between a first photodetector (PD) and an electronic circuit. The method further includes determining whether the monitored current is abnormal. The method further includes controlling a resonant structure to optically couple a first waveguide connected to the first PD to a second waveguide connected to a second PD, different from the first PD, in response to a determination that the monitored current is abnormal.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An integrated circuit comprising:
   an electronic circuit; and
   a photonic device, wherein the photonic device comprises:
   a first photodetector (PD) electrically connected to the electronic circuit;
   a second PD electrically connected to the electronic circuit;
   a first waveguide configured to receive an optical signal input, wherein the first waveguide is optically connected to the first PD;
   a second waveguide optically connected to the second PD; and
   a resonant structure between the first waveguide and the second waveguide, wherein the resonant structure is configured to optically couple the first waveguide to the second waveguide.

2. The integrated circuit of claim 1, wherein the photonic device further comprises a controller, wherein the controller is configured to tune the resonant structure for selectively optically coupling the first waveguide to the second waveguide.

3. The integrated circuit of claim 2, wherein the controller is configured to tune the resonant structure by applying an electrical field to the resonant structure.

4. The integrated circuit of claim 2, wherein the controller is configured to tune the resonant structure by controlling a control element for heating the resonant structure.

5. The integrated circuit of claim 2, wherein the controller is configured to tune the resonant structure based on a measured current between the first PD and the electronic circuit.

6. The integrated circuit of claim 1, wherein the resonant structure comprises multiple resonant rings.

7. The integrated circuit of claim 1, wherein the resonant structure comprises a single resonant ring.

8. The integrated circuit of claim 1, wherein the resonant structure comprises a two stage resonant structure.

9. The integrated circuit of claim 1, wherein the photonic device includes a multiplexer.

10. The integrated circuit of claim 1, wherein the photonic device includes a de-multiplexer.

11. The integrated circuit of claim 1, wherein the photonic device includes a Mach Zehnder Interferometer (MZI).

12. The integrated circuit of claim 1, wherein the photonic device further comprises:
    a third PD electrically connected to the electronic circuit;
    a third waveguide optically connected to the third PD; and
    a second resonant structure between the first waveguide and the third waveguide, wherein the second resonant structure is configured to optically couple the first waveguide to the third waveguide.

13. The integrated circuit of claim 12, wherein the resonant structure has a same structure as the second resonant structure.

14. The integrated circuit of claim 12, wherein the resonant structure has a different structure from the second resonant structure.

15. An integrated circuit comprising:
    an electronic circuit; and
    a photonic device, wherein the photonic device comprises:
    a first photodetector (PD) electrically connected to the electronic circuit;
    a second PD electrically connected to the electronic circuit;
    a first waveguide configured to receive an optical signal input, wherein the first waveguide is optically connected to the first PD;
    a second waveguide optically connected to the second PD;
    a first resonant structure between the first waveguide and the second waveguide, wherein the first resonant structure is configured to optically couple the first waveguide to the second waveguide; and
    a second resonant structure between the first waveguide and the second waveguide, wherein the second resonant structure is configured to optically couple the first waveguide to the second waveguide.

16. The integrated circuit of claim 15, further comprising a controller, wherein the controller is configured to tune the second resonant structure to selectively optically couple the first waveguide to the second waveguide.

17. The integrated circuit of claim 16, wherein the controller is configured to tune the second resonant structure based on a current between the first PD and the electronic circuit.

18. The integrated circuit of claim 15, wherein the second resonant structure is configured to optically couple the first waveguide to the second waveguide during an entire period of operation of the photonic device.

19. The integrated circuit of claim 15, wherein the photonic device includes a multiplexer or a de-multiplexer.

20. An integrated circuit comprising:
    an electronic circuit; and
    a photonic device, wherein the photonic device comprises:
    a plurality of photodetectors electrically connected to the electronic circuit;
    a first plurality of waveguides configured to receive one or more optical signals, wherein each of the first plurality of waveguides is optically connected to a corresponding photodetector of the plurality of photodetectors;
    a second plurality of waveguides; and
    a plurality of resonant structures configured to optically couple optical signals between waveguides, wherein each of the plurality of resonant structures is between each waveguide of the first plurality of waveguides and a corresponding waveguide of the second plurality of waveguides.

* * * * *